US011520552B2

(12) United States Patent
Kato

(10) Patent No.: US 11,520,552 B2
(45) Date of Patent: Dec. 6, 2022

(54) DRAWING SYSTEM

(71) Applicant: Wacom Co., Ltd., Saitama (JP)

(72) Inventor: So Kato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/375,920

(22) Filed: Jul. 14, 2021

(65) Prior Publication Data

US 2021/0342111 A1 Nov. 4, 2021

Related U.S. Application Data

(63) Continuation of application No. PCT/JP2019/043382, filed on Nov. 6, 2019.

(30) Foreign Application Priority Data

Feb. 1, 2019 (JP) .............................. JP2019-016610

(51) Int. Cl.
*G06F 3/14* (2006.01)
*G06F 3/041* (2006.01)
(Continued)

(52) U.S. Cl.
CPC ........ *G06F 3/1423* (2013.01); *G06F 3/03545* (2013.01); *G06F 3/044* (2013.01);
(Continued)

(58) Field of Classification Search
CPC ............... G06F 3/03545; G06F 3/0488; G06F 3/04886; G06F 3/04883; G06F 3/1423;
(Continued)

(56) References Cited

U.S. PATENT DOCUMENTS 5,420,607 A * 5/1995 Miller ..................... G06F 3/037
345/179
6,470,341 B1 10/2002 Rekimoto
(Continued)

FOREIGN PATENT DOCUMENTS

| JP | 11-53236 A | 2/1999 |
| JP | 2005-011233 A | 1/2005 |
| JP | 2016-110178 A | 6/2016 |

OTHER PUBLICATIONS

International Search Report, dated Dec. 17, 2019, for International Application No. PCT/JP2019/043382, 1 page.

*Primary Examiner* — Koosha Sharifi-Tafreshi
(74) *Attorney, Agent, or Firm* — Seed IP Law Group LLP

(57) ABSTRACT

A drawing system that can reserve a large drawing area and that can receive an input of instruction to an instruction input area at appropriately timing to make a drawing corresponding to the input. The drawing system includes a first terminal apparatus and a second terminal apparatus are connected to each other and communicating with each other. A display screen of a display device of the first terminal apparatus is dedicated to a drawing area, and a display screen of a display device of the second terminal apparatus is dedicated to an instruction input area. The first terminal apparatus includes a first position detection sensor, and a drawing is made in the drawing area provided on the display screen of the first display device according to instruction information from the second terminal apparatus and according to a drawing operation input received through the first position detection sensor.

10 Claims, 14 Drawing Sheets

(51) Int. Cl.
 *G06F 3/0354* (2013.01)
 *G06F 3/044* (2006.01)
 *G06F 3/046* (2006.01)

(52) U.S. Cl.
 CPC .......... *G06F 3/046* (2013.01); *G06F 3/04162* (2019.05); *G06F 2203/04106* (2013.01)

(58) Field of Classification Search
 CPC .. G06F 1/1647; G06F 1/1654; G06F 3/04845; G06F 2203/04803; G06F 3/041; G06F 3/0412; G06F 1/1643; G06F 3/0482; G06F 3/0416; G09G 2354/00; G09G 2370/06; G09G 2360/04; G09G 2320/0686
 See application file for complete search history.

(56) References Cited

U.S. PATENT DOCUMENTS

| | | | |
|---|---|---|---|
| 6,801,211 B2 * | 10/2004 | Forsline | G06F 3/03545 345/581 |
| 2002/0147819 A1 * | 10/2002 | Miyakoshi | H04L 29/06 709/228 |
| 2004/0257347 A1 | 12/2004 | Noji | |
| 2006/0034043 A1 * | 2/2006 | Hisano | G06F 1/1679 361/679.04 |
| 2014/0101578 A1 * | 4/2014 | Kwak | G06F 3/017 715/761 |
| 2015/0177975 A1 * | 6/2015 | Lee | G06T 11/40 715/211 |
| 2016/0045019 A1 * | 2/2016 | Srey | A45F 5/00 294/65.5 |
| 2017/0329417 A1 | 11/2017 | Izumi et al. | |

\* cited by examiner

FIG. 2
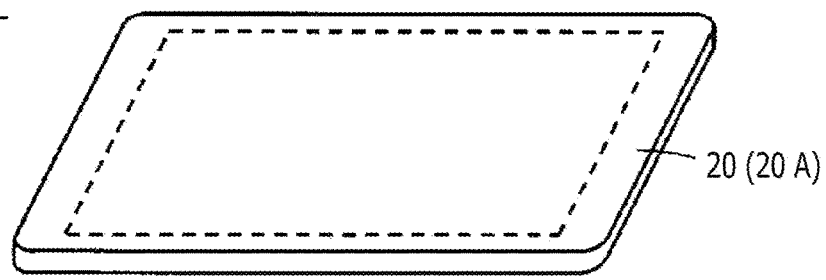
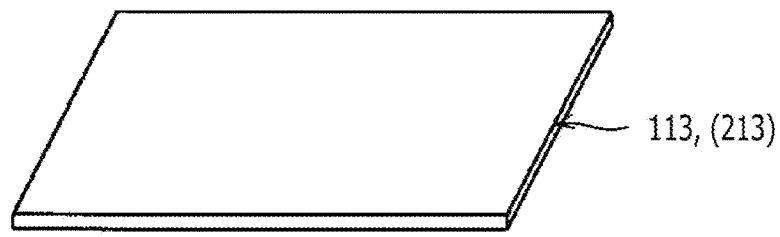
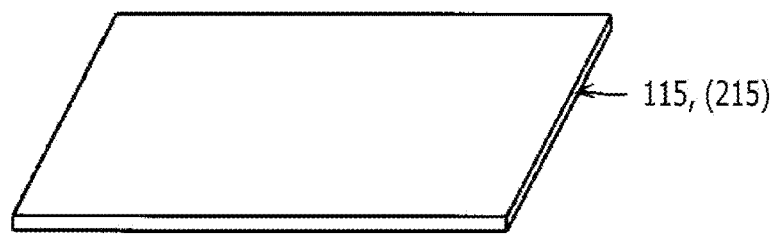
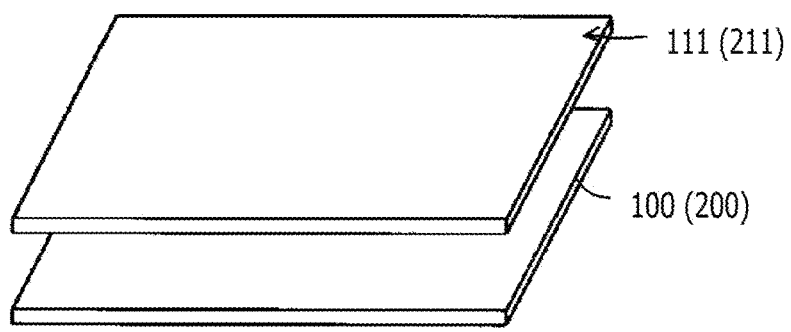
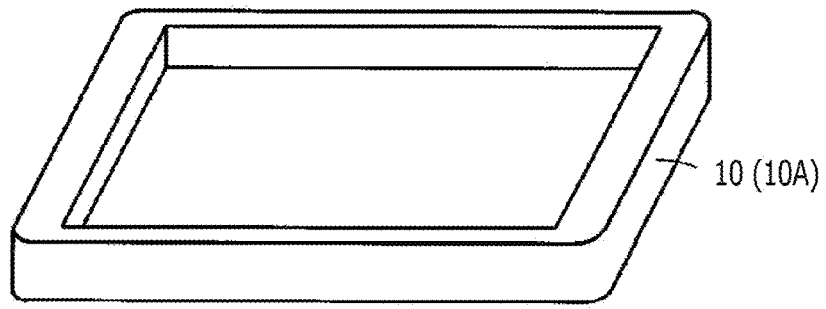

FIG.7
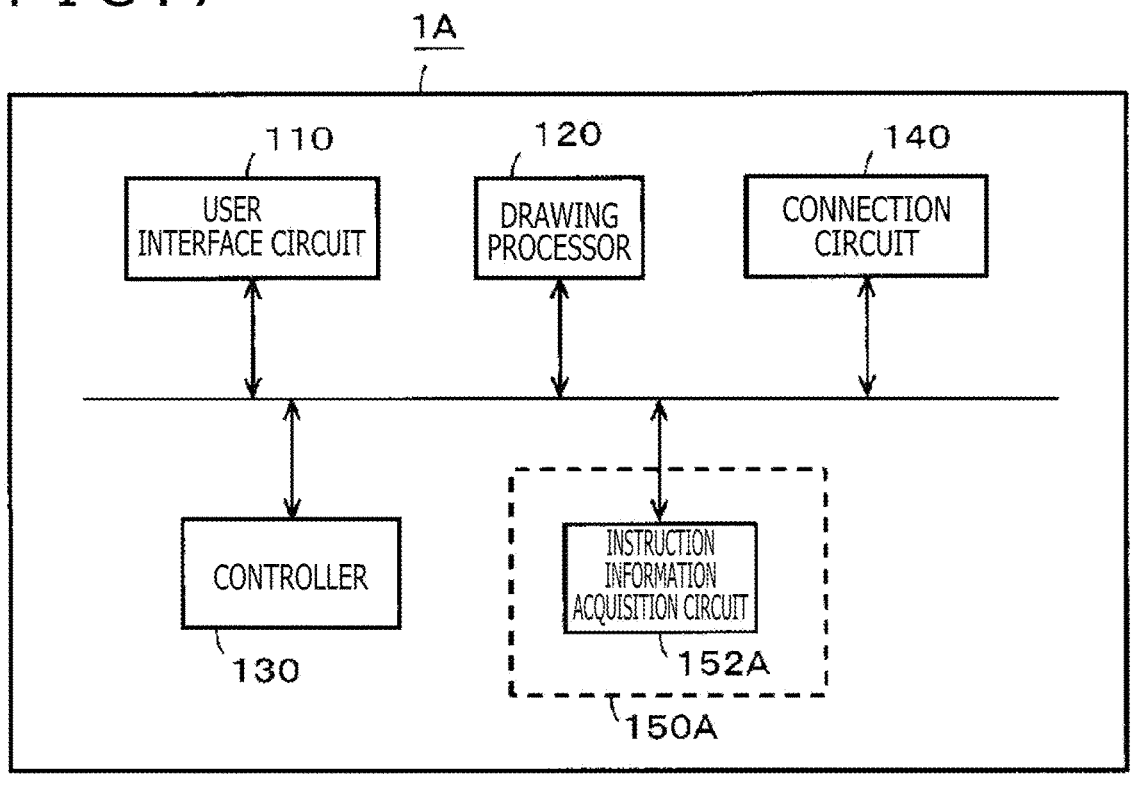
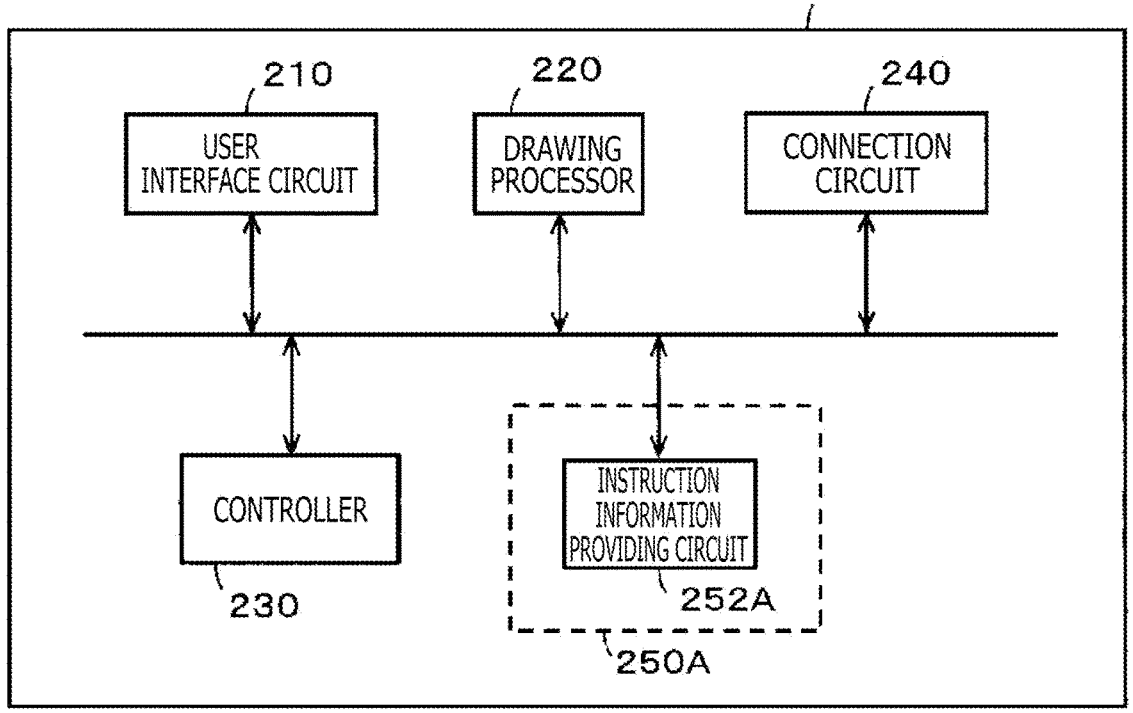

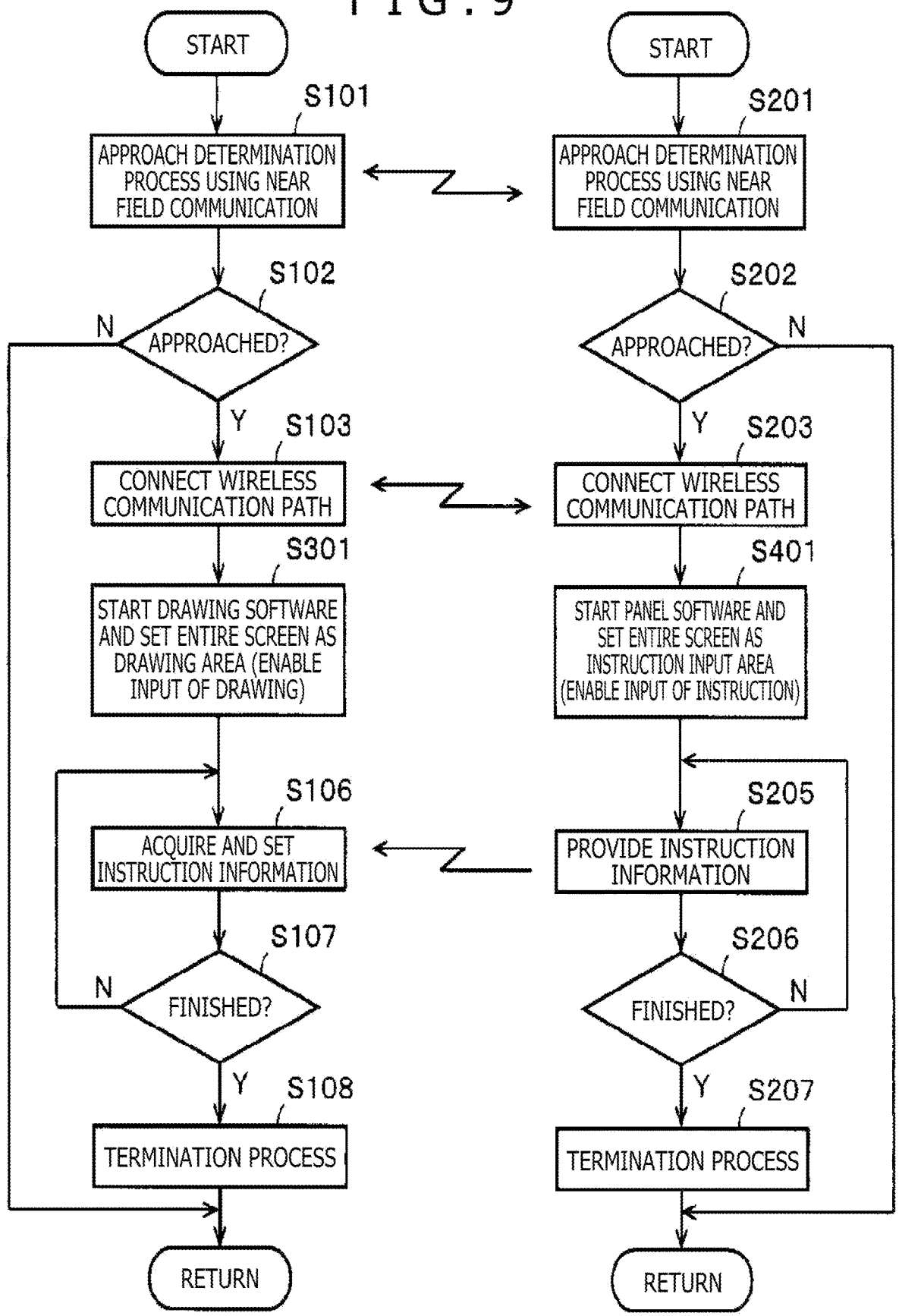

FIG.10
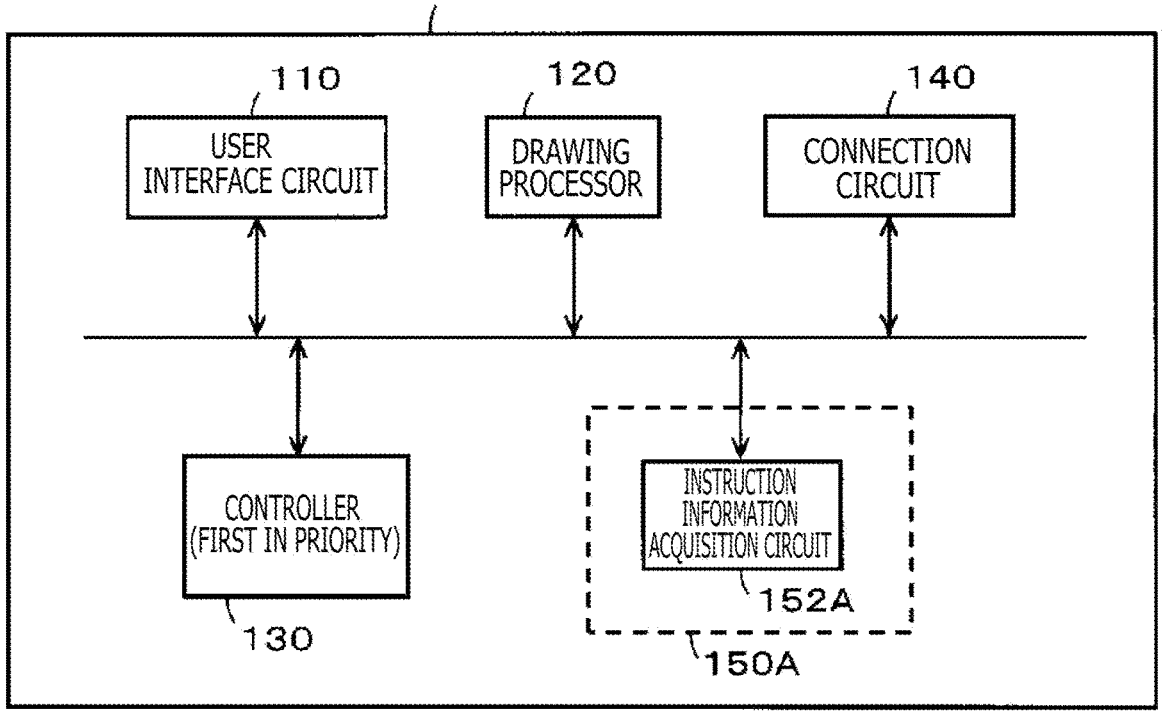
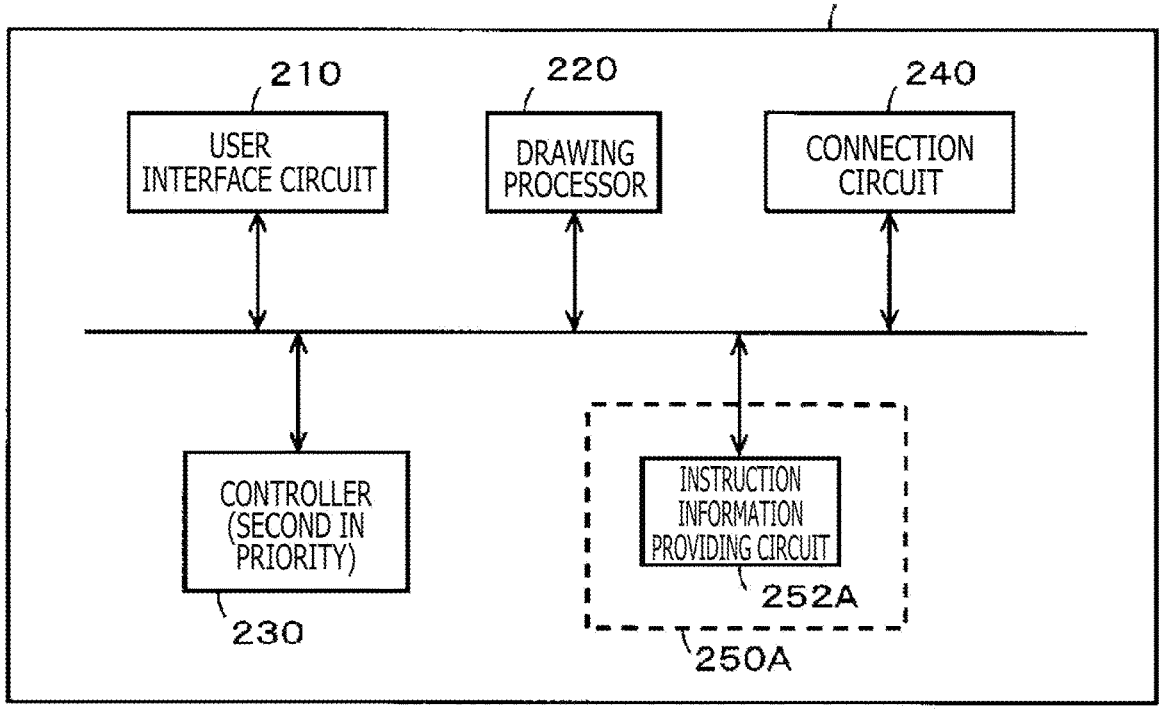

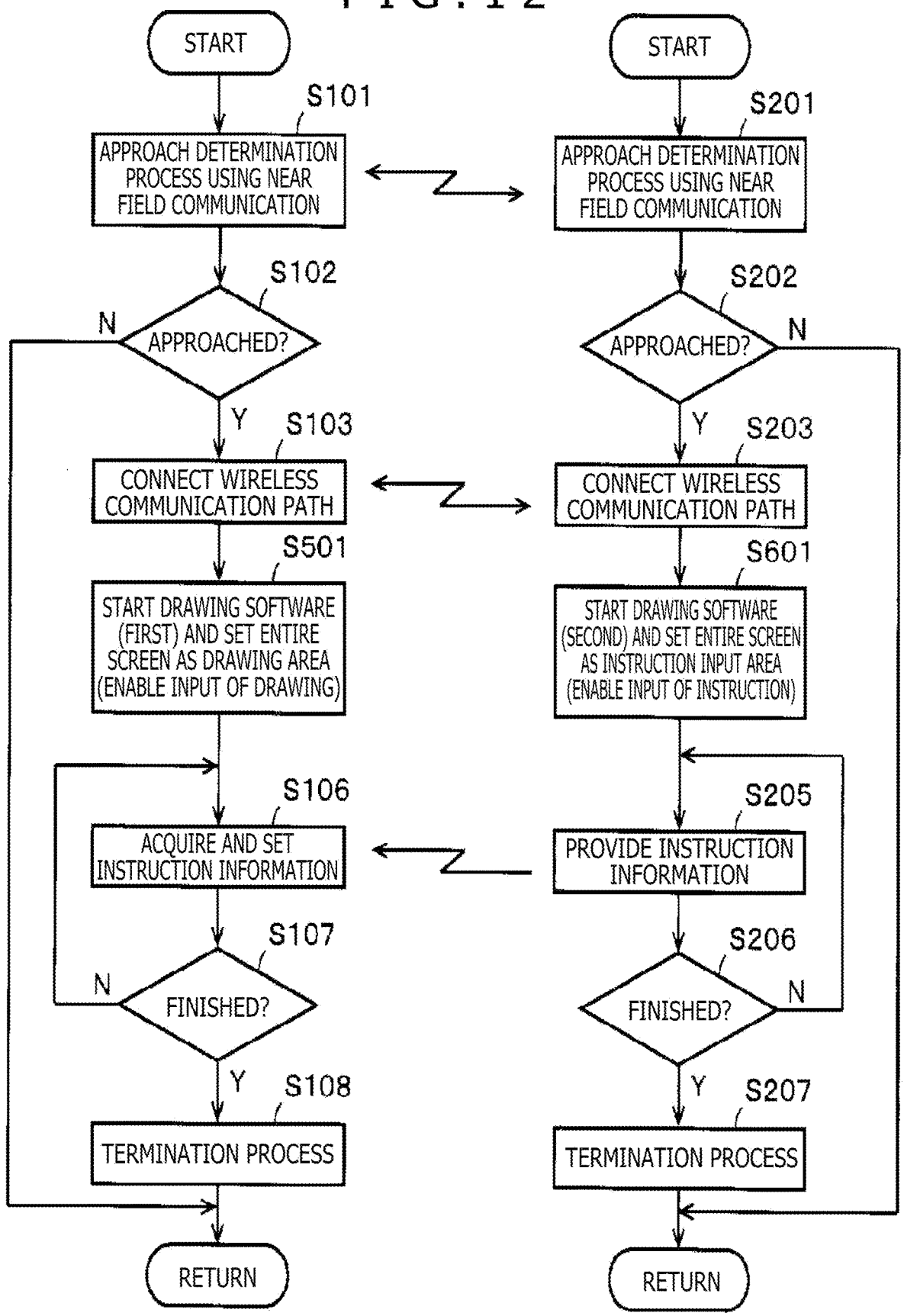

FIG.14
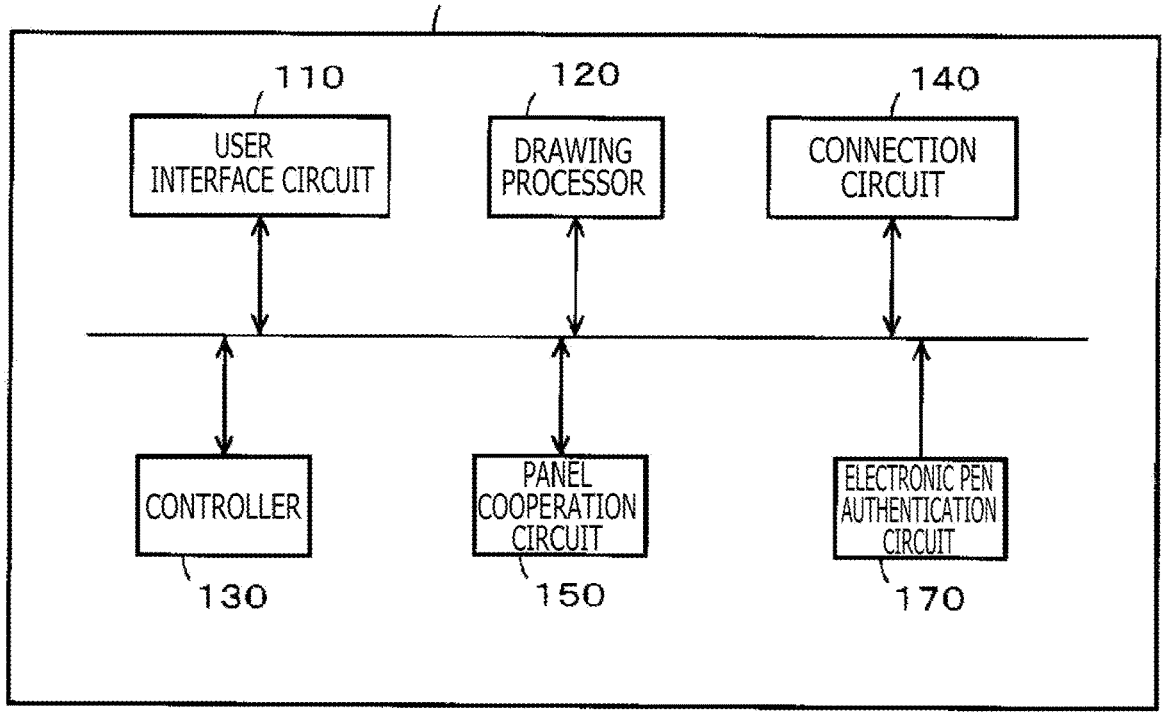
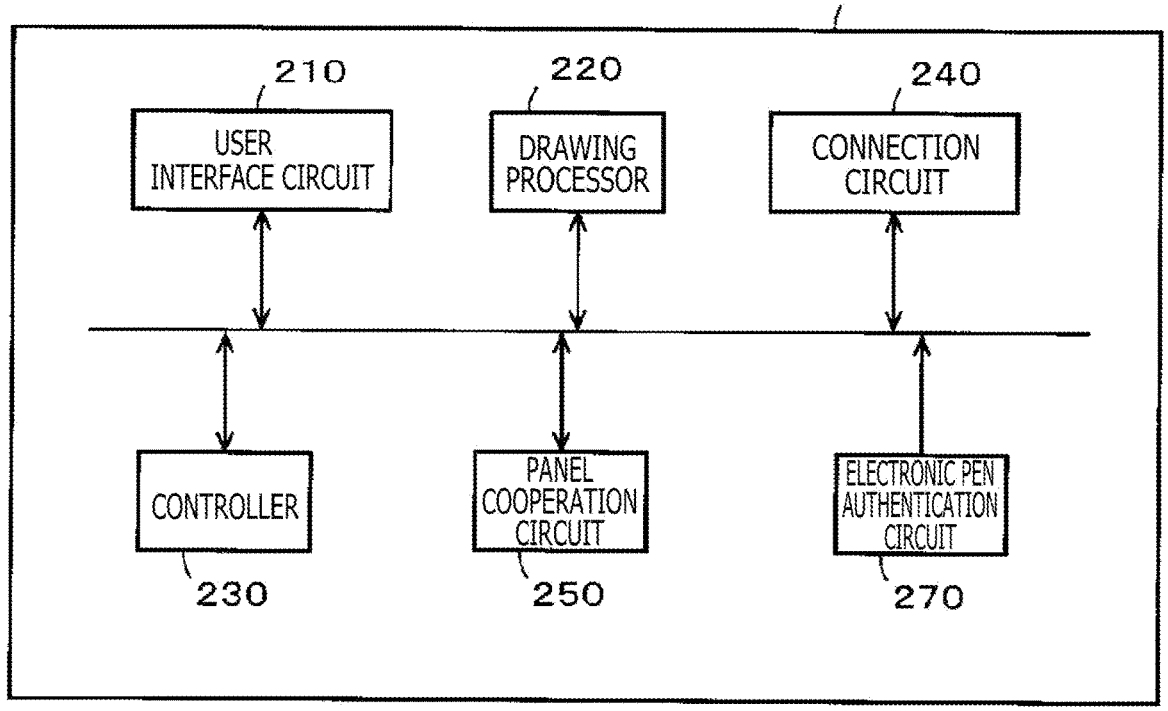

DRAWING SYSTEM

BACKGROUND

Technical Field

This disclosure relates to a drawing system including, for example, a display device and a position detection sensor and including a terminal apparatus that enables to input a drawing using an electronic pen.

Background Art

A tablet PC (Personal Computer) and the like are widely used, the tablet PC including, for example, a display device, such as an LCD (Liquid Crystal Display), and a position detection sensor, the tablet PC enabling to input a drawing using an electronic pen. Generally-called drawing software is executed to input a drawing to the tablet PC. The drawing software provides a drawing area and an instruction input area on a display screen and receives an input of instruction from the user.

The drawing area is an area for receiving an input of drawing by use of an electronic pen and displaying a drawing image corresponding to the input. The instruction input area is an area for displaying an instruction input reception screen and receiving various instruction inputs (input of parameters) related to drawing, such as line type, color, hue, vividness, brightness, and degree of gradation used for drawing. A color selection and the like are also made in the instruction input area, and therefore, the instruction input area is also called a palette or the like in some cases.

The drawing area and the instruction input area are provided in one display screen. Therefore, an unintentional instruction may be input when the electronic pen accidentally enters into the instruction input area during drawing in the drawing area, in some cases. To deal with such a problem, a disclosure related to a coordinate input control method is disclosed in Japanese Patent Laid-Open No. 2005-11233 in which the input of instruction to the instruction input area is invalidated when the electronic pen continuously enters the instruction input area from the drawing area.

The drawing area must be small even in a tablet PC including a display device with a relatively large display screen when both of the drawing area and the instruction input area are provided in the display screen of the apparatus. Along with the improvement in the performance of computers in recent years, a detailed drawing is often made by executing drawing software in a small tablet PC provided with a small display device including a display screen with a size of approximately eight to eleven inches.

In this case, the drawing area becomes very small. If the drawing area is small, the drawn image may be repeatedly scaled in a case of, for example, drawing a detailed image, and the work efficiency may be significantly deteriorated. Therefore, there is a demand for increasing the drawing area as much as possible. On the other hand, the instruction also needs to be appropriately input to the instruction input area at appropriate timing. The drawing cannot be flexibly made according to the intention of the user unless the line type or the color is changed at appropriate timing.

BRIEF SUMMARY

In view of the above, an object is to provide a drawing system that can reserve a large drawing area and that can receive an input of instruction to an instruction input area at appropriate timing to make a drawing according to the input.

To solve the problem, provided is a drawing system including a first terminal apparatus including a first display device and a first position detection sensor corresponding to a display screen of the first display device, and a second terminal apparatus including a second display device and a second position detection sensor corresponding to a display screen of the second display device. The first terminal apparatus and the second terminal apparatus are connected to each other and communicating with each other. The first terminal apparatus includes a first processor, and a first memory storing instructions which, when executed by the first processor, cause the first terminal apparatus to acquire instruction information transmitted from the second terminal apparatus, set the display screen of the first display device as a drawing area, and make a drawing in the drawing area according to the instruction information acquired and according to a drawing operation input received through the first position detection sensor. The second terminal apparatus includes a second processor, and a second memory storing instructions which, when executed by the second processor, cause the second terminal apparatus to set the display screen of the second display device as an instruction input area and display an instruction input reception screen in the instruction input area, and transmit, to the first terminal apparatus, the instruction information received through the instruction input reception screen displayed in the instruction input area and through the second position detection sensor.

According to the drawing system, the first terminal apparatus and the second terminal apparatus are connected to each other and communicating with each other. The display screen of the display device in the first terminal apparatus is dedicated to the drawing area, and the display screen of the display device in the second terminal apparatus is dedicated to the instruction input area. In the first terminal apparatus, a drawing is made in the drawing area provided on the display screen of the first display device according to the instruction information from the second terminal apparatus and according to the drawing operation input received through the first position detection sensor.

BRIEF DESCRIPTION OF THE SEVERAL VIEWS OF THE DRAWINGS

FIG. 2 is an exploded configuration diagram for describing basic structures of first and second terminals in the embodiments of the present disclosure;

FIG. 7 is a block diagram for describing a configuration example of a first terminal apparatus and a configuration example of a second terminal apparatus in a second embodiment of the present disclosure;

FIG. 9 shows flow charts for describing a process performed by the first terminal apparatus and a process performed by the second terminal apparatus in the second embodiment of the present disclosure;

FIG. 10 is a block diagram for describing a configuration example of a first terminal apparatus and a configuration example of a second terminal apparatus in a third embodiment of the present disclosure;

FIG. 12 shows flow charts for describing operations of a process executed by the first terminal apparatus and a process performed by the second terminal apparatus in the third embodiment of the present disclosure;

FIG. 14 is a block diagram for describing a configuration example of the drawing system that performs an authentication process using electronic pen identification information.

DETAILED DESCRIPTION

Figure 1:
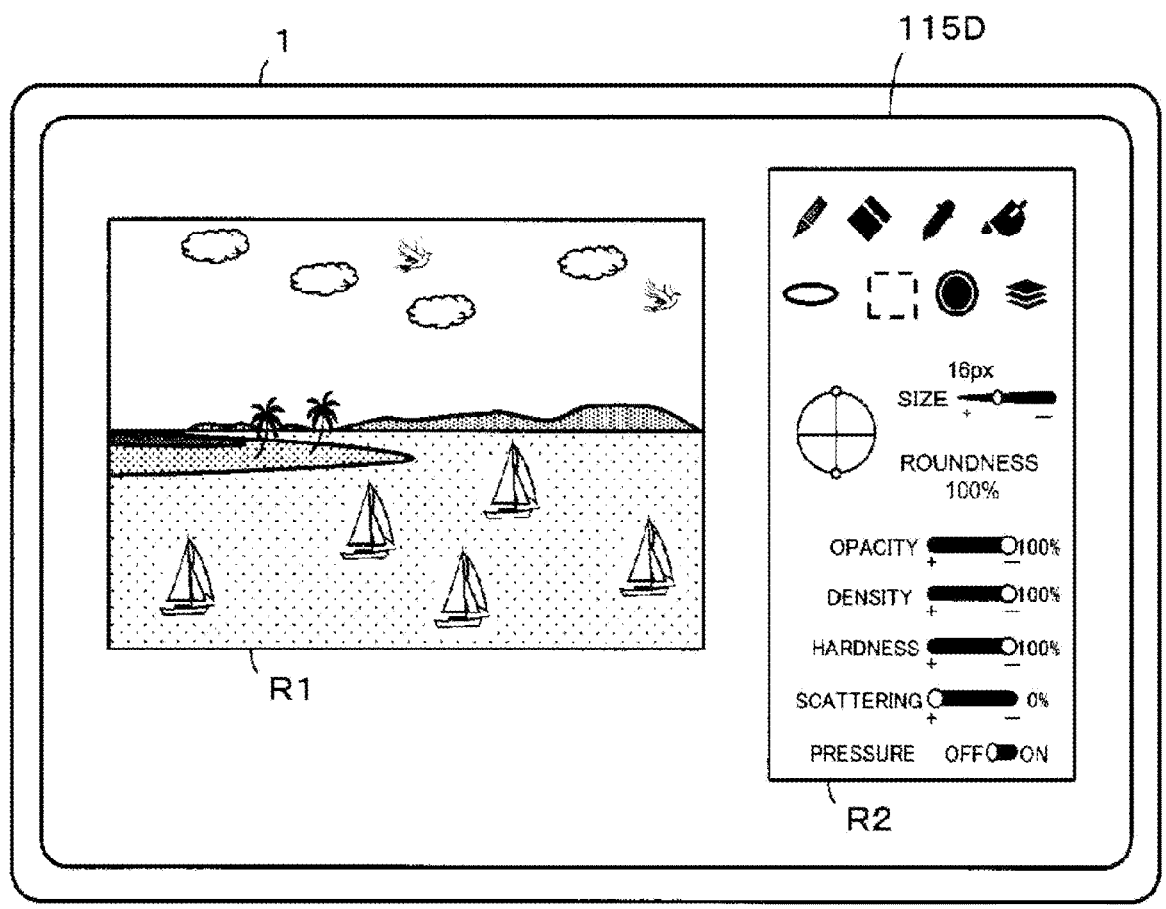
FIG. 1 is a diagram for describing an example of an appearance of a drawing system in embodiments of the present disclosure.

Embodiments of a drawing system of this disclosure will now be described with reference to the drawings. Although three embodiments will be described below, an appearance of the drawing system common to the three embodiments and basic structures of terminal apparatuses included in the drawing system will be described first.

Appearance of Drawing System

FIG. 1 is a diagram for describing an example of an appearance of the drawing system in the embodiments. As illustrated in FIG. 1, the drawing system includes a first terminal apparatus 1 and a second terminal apparatus 2. The first terminal apparatus 1 is realized as a tablet PC or the like including: a thin display device including a display screen with a size of, for example, approximately eight to twelve inches; and a position detection sensor corresponding to the display screen and configured to detect an instruction position of an indicator such as an electronic pen.

The second terminal apparatus 2 includes: a thin display device including a display screen with a size of, for example, approximately four to six inches; and a position detection sensor corresponding to the display screen and configured to detect an instruction position of an indicator such as an electronic pen. Specifically, the second terminal apparatus 2 is realized as, for example, a high-performance mobile phone terminal called a smartphone or as a tablet PC smaller than the first terminal apparatus 1.

The first terminal apparatus 1 and the second terminal apparatus 2 can use a near field communication function to connect a communication path to communicate with each other. There are various standards for the near field communication function, and near field communication functions of various standards can also be used in the drawing system. However, to simplify the following description, a widely and generally used near field communication function of Bluetooth (registered trademark) standard is used between the first terminal apparatus 1 and the second terminal apparatus 2 in the description.

The first terminal apparatus 1 includes drawing software (e.g., instructions), and the first terminal apparatus 1 can execute the drawing software to provide a drawing area R1 and an instruction input area R2 in a display screen 115D as illustrated in FIG. 1 to thereby receive an input from the user. The drawing area R1 is an area for receiving an input of drawing using an electronic pen and for displaying a drawing image corresponding to the input. The instruction input area R2 is an area for displaying an instruction input reception screen to receive various instruction inputs (input of parameters) related to drawing, such as selection of line type and color.

The first terminal apparatus 1 can receive an operation input from the user to the drawing area R1 and the instruction input area R2 and can draw, in the drawing area R1, an image corresponding to the instruction of the user. Therefore, the drawing software in the specification is a two-dimensional computer graphics application for drawing an image on a computer by using a point device (mainly, electronic pen).

However, the size of the display screen 115D of the first terminal apparatus 1 is eight to twelve inches, which is small. Therefore, the drawing area R1 is reduced when the instruction input area R2 is provided as illustrated in FIG. 1, and this deteriorates the work efficiency in creating a drawing. In recent years, smartphones and small tablet PCs are widely used. The user of the first terminal apparatus as a drawing apparatus also possesses a smartphone or a small tablet PC in many cases.

Therefore, the second terminal apparatus 2 is used in addition to the first terminal apparatus 1 to provide one drawing system. In the drawing system, the entire display screen 115D of the first terminal apparatus 1 is used as a drawing area, and the entire display screen 215D of the second terminal apparatus 2 is used as an instruction input area. That is, the drawing area R1 and the instruction input area R2 conventionally provided in the display screen of one terminal apparatus are separately provided in the first terminal apparatus 1 and the second terminal apparatus 2, respectively.

This can prevent the drawing area from being squeezed and reduced by the instruction input area. Instruction information received through the instruction input area provided in the display screen 215D of the second terminal apparatus 2 is provided to the first terminal apparatus 1 through wireless communication. The first terminal apparatus 1 can make a drawing according to the instruction information from the second terminal apparatus and the input of instruction from the user to the drawing area provided in the entire display screen 115D of the first terminal apparatus 1.

Basic Structures of First and Second Terminal Apparatuses

FIG. 2 is an exploded configuration diagram for describing basic structures of the first and second terminal apparatuses. Although the first terminal apparatus 1 and the second terminal apparatus 2 have different sizes as illustrated in FIG. 1, the thin display device and the position detection sensor are mounted on both of them. The first terminal apparatus 1 and the second terminal apparatus 2 have planar external shapes, and the basic structures are similar. Therefore, an example of the case of the first terminal apparatus 1 will be illustrated to describe the basic structures of the first terminal apparatus 1 and the second terminal apparatus 2. Note that in FIG. 2, reference signs in parentheses are reference signs for the second terminal apparatus 2.

As illustrated in FIG. 2, a circuit board 100, a first sensor 111, a display device 115, and a second sensor 113 are housed from bottom in a housing 10 of the first terminal apparatus 1, and these are enclosed in the housing 10 by a front panel 20. Transparent tempered glass or the like is fitted inside of the front panel 20 indicated by a dotted line, and the entire display screen of the display device 115 can be observed. The tempered glass surface of the front panel 20 serves as an operation surface, and the indicator can be used to perform an instruction operation for the first sensor 111 and the second sensor 113 without damaging the second sensor 113 and the like.

Various electronic circuits and electronic parts, such as a control circuit, a display control circuit, a position detection circuit for the first sensor, a position detection circuit for the second sensor, a near field communication circuit, and a semiconductor memory, are mounted on the circuit board 100. The first sensor 111 is an electromagnetic induction sensor. The display device 115 includes, for example, an LCD (Liquid Crystal Display) that is a thin display element, various filters, a backlight, and the like. The second sensor 113 is a capacitive sensor. Therefore, the first terminal apparatus 1 includes position detection sensors of different systems across the display device 115.

The electromagnetic induction first sensor 111 includes a plurality of loop coils arranged in the X-axis direction and the Y-axis direction. A transmission period for sequentially supplying power to the plurality of loop coils of the first sensor 111 to generate a magnetic field and a reception period for stopping the supply of power to receive a magnetic field from the outside are alternately provided. A corresponding electromagnetic induction electronic pen includes a resonant circuit including a coil and a capacitor. A current flows through the coil according to the magnetic field from the first sensor 111, and a signal is generated. The electronic pen adds pen pressure information to the signal and transmits the signal to the first sensor 111. The first sensor 111 receives the signal in the reception period and supplies the signal to the position detection circuit for the first sensor to detect the instruction position of the electronic pen and the pen pressure.

The capacitive second sensor 113 includes a plurality of linear conductors (line electrodes) arranged in the X-axis direction and the Y-axis direction. When a finger (passive position indicator) or a capacitive pen (conductive pen-type position indicator) is brought close to the second sensor 113, there is a change in the capacitance (charge) of the linear conductors. This is supplied to the position detection circuit for the second sensor, and the instruction position is detected. Note that there is a generally-called active capacitive pen driven by a battery to transmit a signal. However, the second sensor 113 is mainly operated by a finger or a simple conductive capacitive pen.

Each of the first sensor 111 and the second sensor 113 corresponds to the entire display screen of the display device 115 and can detect any position instructed on the display screen. In this way, the first terminal apparatus 1 can receive an input of instruction using an electromagnetic induction electronic pen through the first sensor 111 and can receive an input of instruction using a finger or a capacitive pen through the second sensor 113. Particularly, the electromagnetic induction $^{electronic}$ pen can be used to instruct the position in more detail, and the pen pressure applied to the electronic pen can be detected and transmitted to the first sensor 111. Therefore, a detailed drawing can be made.

First Embodiment

Configuration Example of First Terminal Apparatus 1

Figure 3:
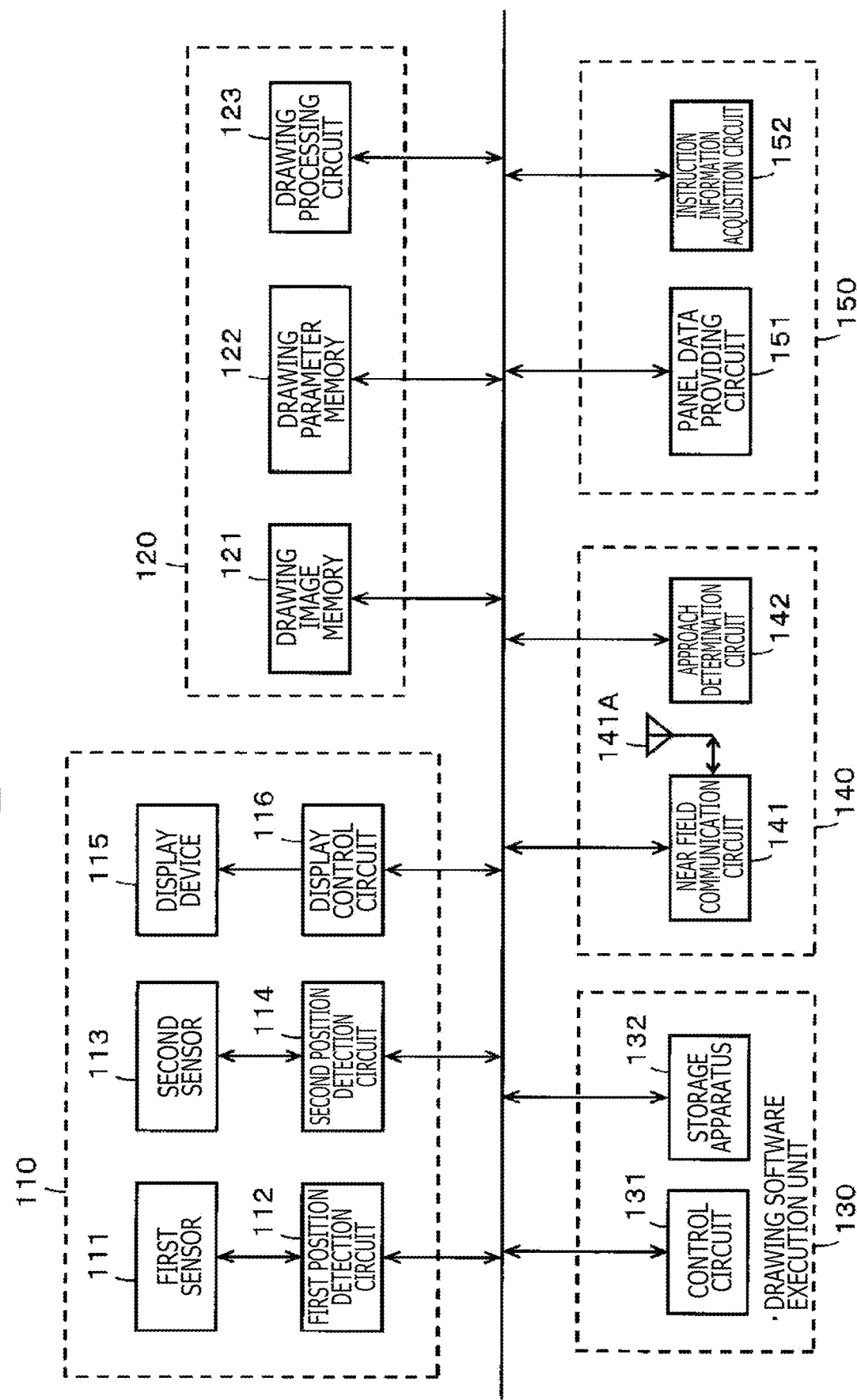
FIG. 3 is a block diagram for describing a configuration example of the first terminal apparatus in a first embodiment of the present disclosure.

FIG. 3 is a block diagram for describing a configuration example of the first terminal apparatus 1 in the first embodiment. The first terminal apparatus 1 includes a user interface circuit 110, a drawing processor 120, a controller 130, a connection circuit 140, and a panel cooperation circuit 150 that are encircled by dotted lines.

The user interface circuit 110 is a circuit that receives an input of instruction from the user and that provides information to the user. As illustrated in FIG. 3, the user interface circuit 110 includes the first sensor 111, a first position detection circuit 112, the second sensor 113, a second position detection circuit 114, the display device 115, and a display control circuit 116.

The first sensor 111 is an electromagnetic induction position detection sensor including an X-axis direction loop coil group and a Y-axis direction loop coil group, and the first position detection circuit 112 is a position detection circuit for the first sensor. The first position detection circuit 112 can sequentially switch and set, for the loop coils in the X-axis direction and the Y-axis direction of the first sensor 111, a transmission period for supplying power to generate a signal (magnetic field) and a reception period for stopping the supply of power to receive a signal (magnetic field) from the electronic pen.

In the reception period, the first position detection circuit 112 can detect the instruction position of the electronic pen according to the position of the loop coil receiving the signal from the electronic pen and can notify the controller 130 and the like of the detection result. The signal from the electronic pen also includes the information related to the pen pressure. Therefore, the first position detection circuit 112 can also detect the pen pressure information from the signal received from the electronic pen and notify the controller 130 and the like of the detection result.

The second sensor 113 is a capacitance position detection sensor including an X-axis direction linear conductor group and a Y-axis direction linear conductor group, and the second position detection circuit 114 is a position detection circuit for the second sensor. The second position detection circuit 114 detects the instruction position of the finger or the capacitive pen based on the capacitance generated in the linear conductors in the X-axis direction and the Y-axis direction of the second sensor 113 and notifies the controller 130 and the like of the detection result.

The display device 115 includes an LCD, various filters, a backlight, and the like. The display control circuit 116 performs processes under the control of the controller 130, such as displaying various types of information on the display screen of the display device 115 and deleting the displayed information.

The drawing processor 120 realizes a function of making a drawing in the first terminal apparatus 1 according to the instruction from the user. The drawing processor 120 includes a drawing image memory 121, a drawing parameter memory 122, and a drawing processing circuit 123. The drawing image memory 121 is a memory (VRAM) corresponding to the display screen of the display device 115, and the drawing image memory 121 stores and holds image data for forming an image drawn according to the instruction of the user. The drawing parameter memory 122 stores and holds various types of setting information (parameter information) related to drawing, such as line type and color, received through the instruction input reception screen displayed in the instruction input area.

The drawing processing circuit 123 performs a process of forming, in the drawing image memory 121, an image corresponding to the input of instruction received through the first sensor 111 based on the parameters stored and held in the drawing parameter memory 122. The drawing processing circuit 123 can also perform a process of deleting the image formed in the drawing image memory 121 according to the input of instruction received through the first sensor 111. In the deletion of the image in this case, part of the drawn image can be deleted.

The controller 130 is a circuit that realizes a function of controlling the components of the first terminal apparatus 1, and the controller 130 includes a control circuit 131 and a storage apparatus 132. Although not illustrated, the control circuit 131 includes a CPU (Central Processing Unit), a ROM (Read Only Memory), a RAM (Random Access Memory), a non-volatile memory, and the like. The control circuit 131 executes various types of software to control the components to realize various functions of the first terminal apparatus 1. The storage apparatus 132 includes, for example, a semiconductor memory with relatively large capacity and a driver of the semiconductor memory, and the storage apparatus 132 writes, deletes, and changes information in the semiconductor memory and reads information from the semiconductor memory. The storage apparatus 132 stores and holds information necessary for various types of application software and processes, information created by the user, and the like, and the storage apparatus 132 is also used as a work area for holding the progress of processes.

The connection circuit 140 is a circuit that realizes a near field communication function, and the connection circuit 140 includes a near field communication circuit 141, a near field communication antenna 141A, and an approach determination circuit 142. The near field communication circuit 141 and the near field communication antenna 141A realize a near field communication function of Bluetooth (registered trademark) standard. The approach determination circuit 142 determines, based on the state of the near field communication circuit 141 and the received information, whether the second terminal apparatus 2 has approached and communication can be performed by connecting the communication path through the near field communication circuit 141 and the near field communication antenna 141A.

The panel cooperation circuit 150 cooperates with the second terminal apparatus 2 to realize a function of providing the instruction input area in the second terminal apparatus 2 and receiving the instruction information received by the second terminal apparatus. The panel cooperation circuit 150 includes a panel data providing circuit 151 and an instruction information acquisition circuit 152. The panel data providing circuit 151 functions when the approach determination circuit 142 determines that the second terminal apparatus 2 has approached the first terminal apparatus and the communication path is connected and the communication can be performed.

The panel data providing circuit 151 is configured to set the display screen 215D of the second terminal apparatus 2 as an instruction input area, receive an input of instruction from the user, and provide, to the second terminal apparatus 2, panel data (screen information) for transmitting the received instruction information to the first terminal apparatus. The panel data includes, for example, image data for forming the instruction input reception screen displayed on the display screen 215D of the second terminal apparatus 2 and software for performing a process of receiving the input of instruction from the user through the instruction input reception screen and transmitting the input to the first terminal apparatus. The panel data is provided to the second terminal apparatus 2 through the near field communication circuit 141 and the near field communication antenna 141A.

The instruction information acquisition circuit 152 performs a process of acquiring the instruction information (parameters) related to drawing from the second terminal apparatus 2 received through the near field communication antenna 141A and the near field communication circuit 141 and recording the instruction information in the drawing parameter memory 122. The instruction information from the second terminal apparatus 2 is instruction information provided to the second terminal apparatus 2 by using the function of the panel data providing circuit 151 of the first terminal apparatus 1 and corresponding to the input of instruction received through the instruction information input screen displayed on the display screen 215D as described above.

Once the power is input to the first terminal apparatus 1, the control circuit 131 displays icons corresponding to executable software on the display screen 115D of the display device 115 through the display control circuit 116, based on the information stored and held in the storage apparatus 132. The control circuit 131 receives a selection input of an icon through the second sensor 113 and the second position detection circuit 114 and performs the software corresponding to the selected icon to allow the user to execute the target process.

In the first terminal apparatus 1 of the first embodiment, the connection circuit 140 and the panel cooperation circuit 150 can function under the control of the control circuit 131 and execute the drawing software to realize the drawing function in cooperation with the second terminal apparatus 2. Details of the drawing function realized by the cooperation of the first terminal apparatus 1 and the second terminal apparatus 2 will be described later.

Configuration Example of Second Terminal Apparatus 2

Figure 4:
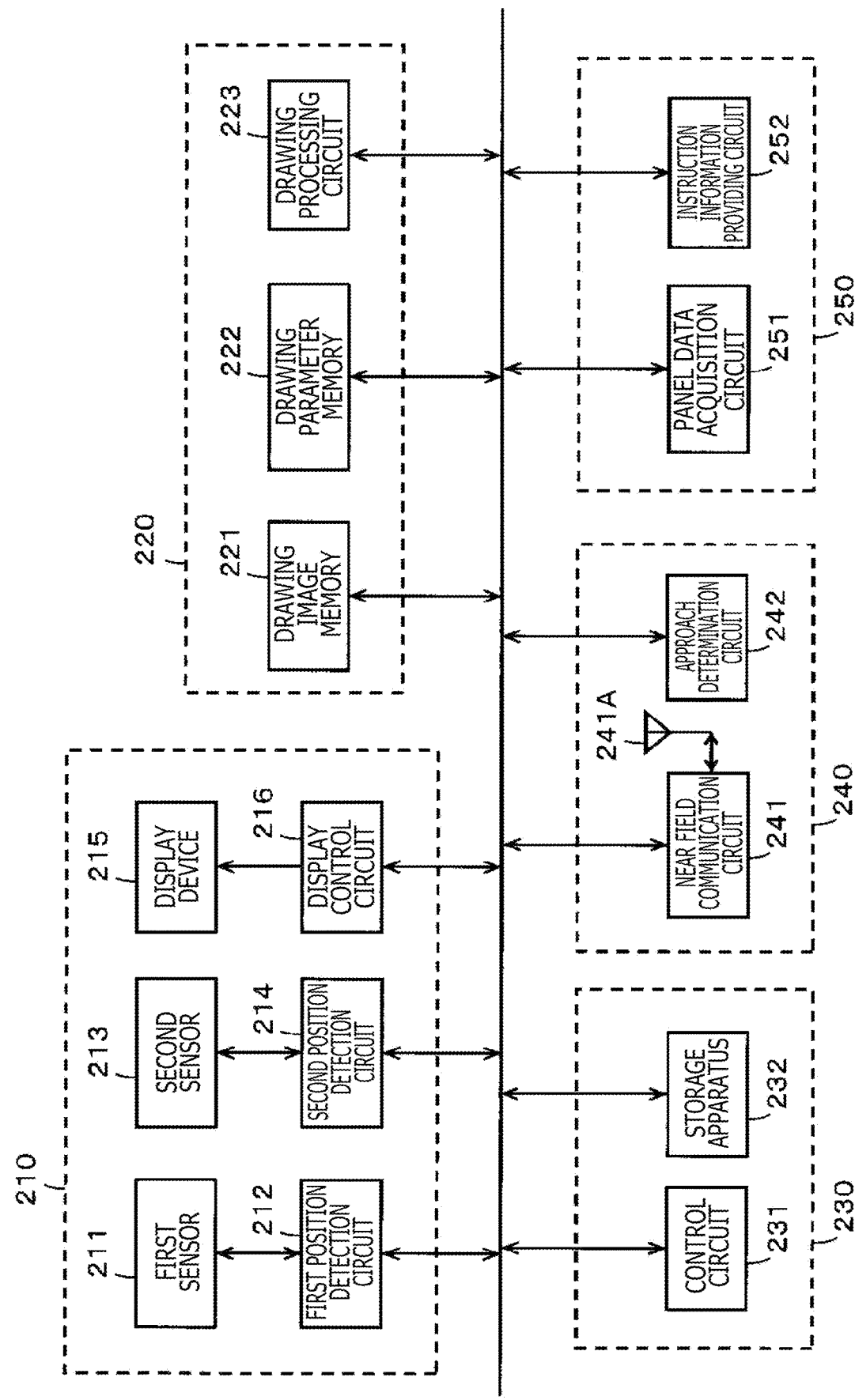
FIG. 4 is a block diagram for describing a configuration example of the second terminal apparatus in the first embodiment of the present disclosure.

FIG. 4 is a block diagram for describing a configuration example of the second terminal apparatus 2 in the first embodiment. The second terminal apparatus 2 includes a user interface unit 210, a drawing processor 220, a controller 230, a connection circuit 240, and a panel cooperation circuit 250 that are encircled by dotted lines.

The configurations of the user interface unit 210, the drawing processor 220, the controller 230, and the connection circuit 240 of the second terminal apparatus 2 are similar to the configurations of the corresponding constituent parts with the same names in the first terminal apparatus 1. Therefore, the description of the components of the second terminal apparatus 2 will not be repeated. However, the sizes of a first sensor 211, a second sensor 213, and a display device 215 of the second terminal apparatus are different from the sizes of the first sensor 111, the second sensor 113, and the display device 115 of the first terminal apparatus.

The configuration of the panel cooperation circuit 250 of the second terminal apparatus 2 is different from the configuration of the panel cooperation circuit 150 of the first terminal apparatus 1. The panel cooperation circuit 250 of the second terminal apparatus 2 includes a panel data acquisition circuit 251 and an instruction information providing circuit 252. The panel data acquisition circuit 251 acquires the panel data transmitted from the first terminal apparatus 1 and received through a near field communication antenna 241A and a near field communication circuit 241. The panel data acquisition circuit 251 stores the acquired panel data in, for example, a storage apparatus 232.

A control circuit 231 executes software, which is for receiving an input of instruction, in the panel data stored in, for example, the storage apparatus 232 by the panel data acquisition circuit 251. In this way, the information for displaying the instruction input reception screen is supplied to a display control circuit 216 through the control of the control circuit 231, and the instruction input reception screen is displayed on the display screen 215D of the display device 215. The input of instruction from the user can be received through the instruction input reception screen displayed on the display screen 215D and through one of the set of the first sensor 211 and a first position detection circuit 212 and the set of the second sensor 213 and a second position detection circuit 214.

The instruction information providing circuit 252 performs a process of transmitting, to the first terminal apparatus 1, instruction information corresponding to the input of instruction received through the instruction input reception screen displayed on the display screen 215D of the display device 215 and through the first sensor 211 and the first position detection circuit 212. In this case, the instruction information is transmitted to the first terminal apparatus 1 through the near field communication circuit 241 and the near field communication antenna 241A.

Note that the user usually uses the electronic pen used for the drawing to operate the instruction input reception screen in many cases, and in that case, the input of instruction is received through the instruction input reception screen and through the electromagnetic induction first sensor 211 and the first position detection circuit 212. However, when the user brings a finger or the like into contact with the display screen 215D, the input of instruction can be obviously received through the instruction input reception screen and through the electrostatic induction second sensor 213 and the second position detection circuit 214.

Therefore, in the second terminal apparatus 2 of the first embodiment, the connection circuit 240 and the panel cooperation circuit 250 can function under the control of the control circuit 231 and cooperate with the first terminal apparatus 1 to realize the drawing function corresponding to the drawing software executed by the first terminal apparatus 1.

When the power is input also to the second terminal apparatus 2, the control circuit 231 displays icons corresponding to executable software on the display screen 215D of the display device 215 through the display control circuit 216 based on the information stored and held in the storage apparatus 232. The control circuit 231 can receive a selection input of an icon through the second sensor 213 and the second position detection circuit 214 and execute the software corresponding to the selected icon to allow the user to perform the target process.

Outline of Operation of Drawing System in First Embodiment

Figure 5A:
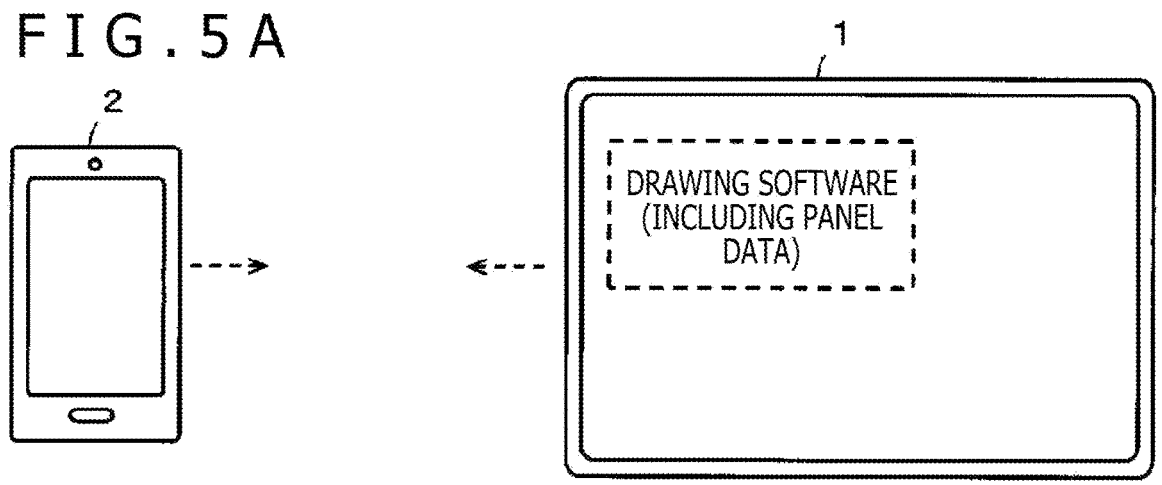
FIGS. 5A to 5C are diagrams for describing an outline of operations of the first terminal apparatus and the second terminal apparatus in the first embodiment of the present disclosure.
Figure 5B:
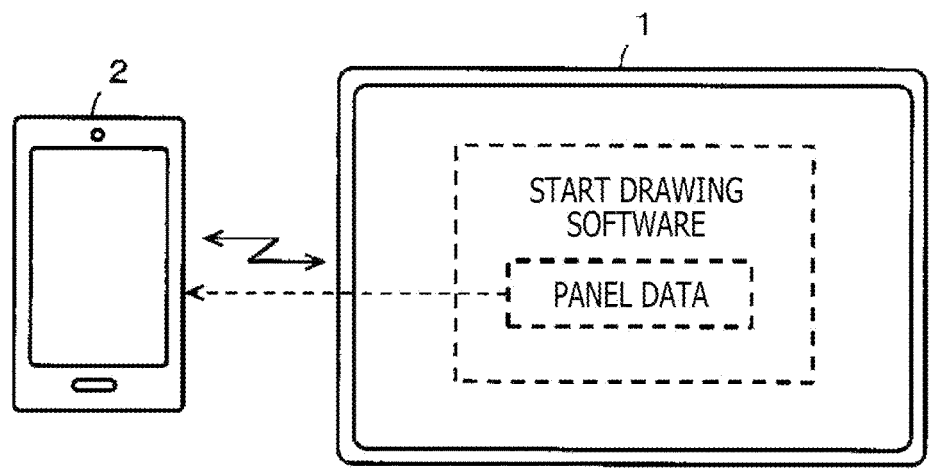
Figure 5C:
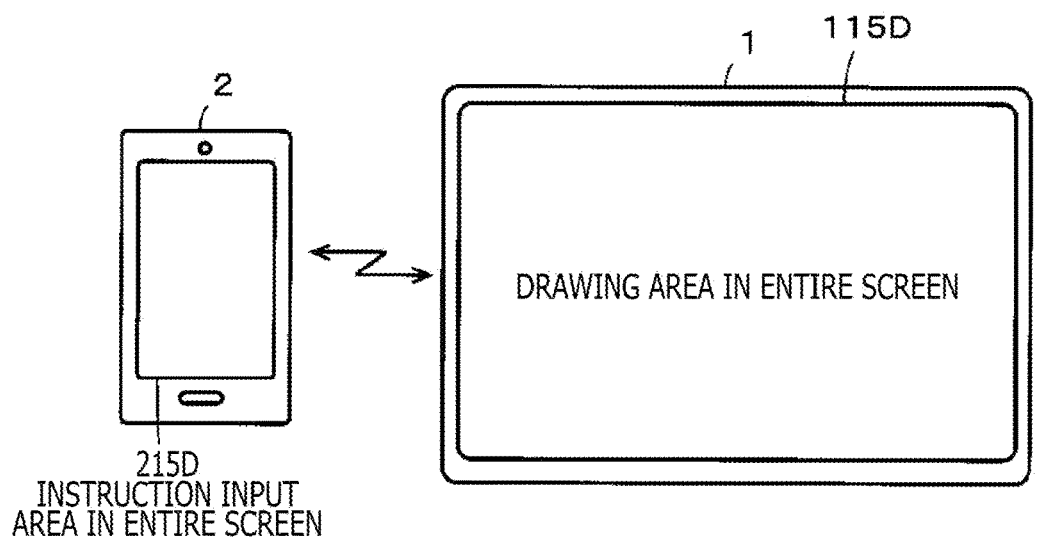

FIGS. 5A to 5C are diagrams for describing an outline of operations of the first terminal apparatus 1 and the second terminal apparatus 2 included in the drawing system of the first embodiment. As illustrated in FIG. 5A, drawing software is installed on the first terminal apparatus 1. The drawing software also includes panel data to be provided to the second terminal apparatus 2. In the state illustrated in FIG. 5A, it is assumed that the power is input to each of the first terminal apparatus 1 and the second terminal apparatus 2, and the terminal apparatuses cannot use the near field communication function to perform wireless communication because the terminal apparatuses are away from each other. In this case, the first terminal apparatus 1 and the second terminal apparatus 2 function independently from each other.

It is assumed that the first terminal apparatus 1 and the second terminal apparatus 2 supplied with power are brought close to each other as indicated by dotted arrows in FIG. 5A. As illustrated in FIG. 5B, it is assumed that the first terminal apparatus 1 and the second terminal apparatus 2 are close to each other and the first terminal apparatus 1 and the second terminal apparatus 2 can use the near field communication to wirelessly communicate with each other. In this case, the drawing software is started (executed) in the first terminal apparatus 1, and the panel data is transmitted to the second terminal apparatus 2 as illustrated in FIG. 5B. The second terminal apparatus 2 receives and uses the panel data from the first terminal apparatus 1.

In this way, as illustrated in FIG. 5C, the first terminal apparatus 1 uses the function of the drawing software to set the entire display screen 115D of the display device 115 as a drawing area, and a drawing can be input through the drawing area. The second terminal apparatus 2 uses the function of the panel data from the first terminal apparatus 1 to set the entire display screen 215D of the display device 215 as an instruction input area. The instruction input reception screen is displayed here, and an input of instruction from the user can be received.

The instruction information providing circuit 252 functions to transmit, to the first terminal apparatus 1, the instruction information received through the instruction input reception screen displayed on the display screen 215D of the second terminal apparatus 2 and through the first sensor 211 and the first position detection circuit 212. The instruction information from the second terminal apparatus 2 includes various parameters related to drawing, such as line type and color, and the first terminal apparatus 1 can acquire the instruction information from the second terminal apparatus 2 and make a drawing in the drawing area according to the instruction information.

Figure 6:
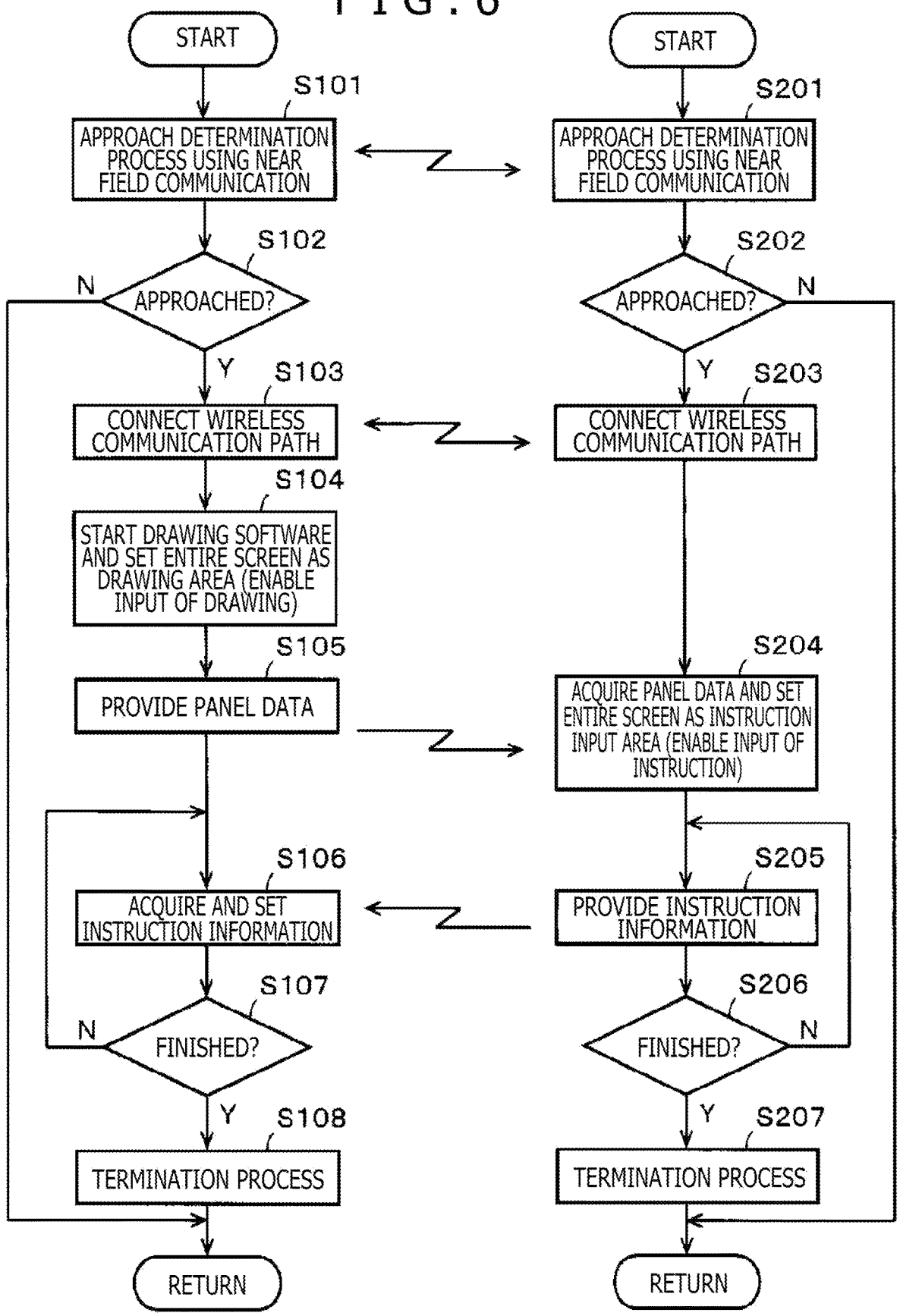
FIG. 6 shows flow charts for describing a process performed by the first terminal apparatus and a process performed by the second terminal apparatus in the first embodiment of the present disclosure.

Processes of First Terminal Apparatus 1 and Second Terminal Apparatus 2 in First Embodiment FIG. 6 shows flow charts for describing a process performed by the first terminal apparatus 1 and a process performed by the second terminal apparatus 2 in the first embodiment, respectively. The first terminal apparatus 1 performs the process illustrated in the left side of FIG. 6 in a state in which the power is input, and no software is executed. Similarly, the second terminal apparatus 2 performs the process illustrated in the right side of FIG. 6 in a state in which the power is input, and no software is executed.

In the first terminal apparatus 1, the near field communication circuit 141 transmits and receives connection request signals, and the approach determination circuit 142 performs a process of determining whether the second terminal apparatus 2 has approached based on reception conditions of the connection request signals from external devices (S101). The determination process of S101 is continuously performed until the approach determination circuit 142 determines that the second terminal apparatus 2 has approached or until there is a predetermined termination event, such as execution of software and operation for turning off the power.

When the determination process of S101 is finished, the control circuit 131 determines whether the second terminal apparatus 2 has approached based on the detection output from the approach determination circuit 142 (S102). There is a predetermined termination event when the control circuit 131 determines that the second terminal apparatus 2 has not approached in the determination process of S102. Therefore, the control circuit 131 terminates the process illustrated in the left side of FIG. 6 and waits for the next execution timing. When the control circuit 131 determines that the second terminal apparatus 2 has approached in the determination process of S102, the control circuit 131 controls the near field communication circuit 141 to execute a process of performing near field communication with the second terminal apparatus 2 to connect the communication path (S103).

Similarly, the near field communication circuit 241 in the second terminal apparatus 2 transmits and receives connection request signals, and the approach determination circuit 242 performs a process of determining whether the first terminal apparatus 1 has approached based on reception conditions of the connection request signals from external devices (S201). The determination process of S201 is continued until the approach determination circuit 242 determines that the first terminal apparatus 1 has approached or until there is a predetermined termination event, such as execution of software and operation of turning off the power, as in the process of S101.

When the determination process of S201 is finished, the control circuit 231 determines whether the first terminal apparatus 1 has approached based on the detection output from the approach determination circuit 242 (S202). There is a predetermined termination event when the control circuit 231 determines that the first terminal apparatus 1 has not approached in the determination process of S202, and the control circuit 231 terminates the process illustrated in the right side of FIG. 6 and waits for the next execution timing. When the control circuit 231 determines that the first terminal apparatus 1 has approached in the determination process of S202, the control circuit 231 controls the near field communication circuit 241 to perform a process of near field communication with the first terminal apparatus 1 to connect the communication path (S203).

In this way, the first terminal apparatus 1 and the second terminal apparatus 2 can use the near field communication to wirelessly communicate with each other through the near field communication circuit 141 and the near field communication antenna 141A for the first terminal apparatus 1 and through the near field communication circuit 241 and the near field communication antenna 241A for the second terminal apparatus 2.

After the process of S103, the control circuit 131 in the first terminal apparatus 1 starts the drawing software and sets the entire display screen 115D of the display device 115 as a drawing area to allow receiving an input of drawing from the user (S104). That is, after the process of S104, the first terminal apparatus 1 shifts to a state in which the drawing can be made according to the instruction input of the user. In this way, the first terminal apparatus 1 can receive the drawing input (position input instruction) of the user using the electronic pen through the first sensor 111 and the first position detection circuit 112 and can display the drawing image corresponding to the drawing input on the display screen 115D of the display device 115. In the first terminal apparatus 1, the panel data providing circuit 151 functions under the control of the control circuit 131 and transmits the panel data to the second terminal apparatus 2 through the near field communication (S105).

The second terminal apparatus 2 receives the panel data from the first terminal apparatus 1, and the panel data acquisition circuit 251 acquires the panel data. The second terminal apparatus 2 uses the panel data to display the instruction input reception screen on the display screen 215D of the display device 215 to allow receiving an input of instruction (S204). That is, after the process of S204, the second terminal apparatus 2 shifts to a state in which the instruction information corresponding to the instruction input of the user can be received. In this case, the entire display screen 215D of the display device 215 of the second terminal apparatus 2 is set as an instruction input area, and the instruction input reception screen is displayed here. The input of instruction from the user can be received through the instruction input reception screen displayed on the display screen 215D and through one of the set of the first sensor 211 and the first position detection circuit 212 and the set of the second sensor 213 and the second position detection circuit 214.

Subsequently, the control circuit 231 of the second terminal apparatus 2 controls the instruction information providing circuit 252 to perform an instruction information providing process (S205). When the instruction input related to drawing is received, the process of S205 is a process in which the instruction information providing circuit 252 functions to form instruction information to be provided to the first terminal apparatus 1 and proceed to the next after wirelessly transmitting the instruction information. When the instruction input related to drawing is not received, the process of S205 is a process of proceeding to the next without executing anything.

On the other hand, the control circuit 131 in the first terminal apparatus 1 controls the instruction information acquisition circuit 152 to perform an acquisition setting process of the instruction information (S106). When the instruction information related to drawing is acquired, the process of S106 is a process in which the instruction information acquisition circuit 152 functions to store (set) the acquired instruction information in the drawing parameter memory 122. When the instruction information from the second terminal apparatus 2 is not acquired, the process of S106 is a process of proceeding to the next without executing anything.

The instruction information from the second terminal apparatus 2 includes parameters related to drawing, such as line type and color, as also described above. Therefore, the instruction information can be set in the drawing parameter memory 122 to make a drawing according to the instruction information. As a result, when the instruction information is information related to, for example, the line type and the color, the drawing can be made based on the instructed line type and the instructed color.

Subsequently, the control circuit 131 in the first terminal apparatus 1 determines whether there is a termination event, such as a predetermined operation for terminating the execution of the drawing software (S107). When the control circuit 131 determines that there is no termination event in the determination process of S107, the control circuit 131 repeats the process from S106 to allow continuously receiving the input of drawing from the user. When the control circuit 131 determines that there is a termination even in the determination process of S107, the control circuit 131 performs a termination process, such as releasing the communication path connected in S103 and returning the display image of the display screen to the state before the execution of the drawing software (S108). Subsequently, the process illustrated in the left side of FIG. 6 ends.

On the other hand, the control circuit 231 in the second terminal apparatus 2 also determines whether there is a termination event, such as a predetermination operation for terminating the reception of the input of instruction through the instruction input reception screen, after the process of S205 (S206). When the control circuit 231 determines that there is no termination event in the determination process of S206, the control circuit 231 repeats the process from S205 to allow continuously receiving the input of instruction from the user. When the control circuit 231 determines that there is a termination event in the determination process of S206, the control circuit 231 performs a termination process, such as releasing the communication path connected in S203 and returning the display image of the display screen to the state before the display of the instruction input reception screen (S207). Subsequently, the process illustrated in the right side of FIG. 6 ends.

In this way, the entire display screen 115D of the first terminal apparatus 1 can be set as a drawing area. The entire display screen 215D of the second terminal apparatus 2 can be set as an instruction input area, and the instruction input reception screen can be displayed to receive the input of instruction related to drawing. The instruction information corresponding to the received input of instruction can be transmitted and provided to the first terminal apparatus 1. As a result, a large drawing area can be reserved, and the drawing can be appropriately input without repeatedly scaling the drawing. Furthermore, the input of instruction related to drawing, such as line type and color, can be received on the second terminal apparatus 2 side, and the instruction information (parameter information) corresponding to the input of instruction can be provided to the first terminal apparatus 1. As a result, a drawing intended by the user can also be appropriately made by using the drawing system including the first terminal apparatus 1 and the second terminal apparatus 2.

Second Embodiment

Configuration Examples of First Terminal Apparatus 1A and Second Terminal Apparatus 2A A drawing system of a second embodiment also includes two terminal apparatuses including a first terminal apparatus and a second terminal apparatus as in the drawing system of the first embodiment described with reference to FIG. 1. Specifically, the drawing system includes a first terminal apparatus 1A realized as a tablet PC or the like and a second terminal apparatus 2A realized as a smartphone, a small tablet PC, or the like. Both of the first terminal apparatus 1A and the second terminal apparatus 2A of the second embodiment are planar (thin) apparatuses having the basic structures described with reference to FIG. 2.

However, executed software and configurations of panel cooperation units of the first terminal apparatus 1A and the second terminal apparatus 2A in the second embodiment described below are different from those of the first terminal apparatus 1 and the second terminal apparatus 2 in the first embodiment. FIG. 7 is a block diagram for describing a configuration example of the first terminal apparatus 1A and a configuration example of the second terminal apparatus 2A in the second embodiment. In the first terminal apparatus 1A illustrated on the upper side of FIG. 7, the same reference signs are provided to parts configured similarly to the first terminal apparatus 1 of the first embodiment described with reference to FIG. 3, and the detailed description of the parts will not be repeated. Similarly, in the second terminal apparatus 2A illustrated on the lower side of FIG. 7, the same reference signs are provided to parts configured similarly to the second terminal apparatus 2 of the first embodiment described with reference to FIG. 4, and the detailed description of the parts will not be repeated.

The controller 130 of the first terminal apparatus 1A illustrated on the upper side of FIG. 7 also functions as a drawing software execution unit as in the first terminal apparatus 1 of the first embodiment. However, drawing software executed by the controller 130 of the first terminal apparatus 1A does not have the function of providing the panel data to the second terminal apparatus 2A, unlike the drawing software used in the first terminal apparatus 1 of the first embodiment. Therefore, a panel cooperation circuit 150A of the first terminal apparatus 1A in the second embodiment includes only an instruction information acquisition circuit 152A and does not include a panel data providing circuit.

The controller 230 of the second terminal apparatus 2A illustrated on the lower side of FIG. 7 functions as an execution unit of panel software for displaying the instruction input reception screen on the display screen 215D and receiving an input of instruction from the user. Therefore, the second terminal apparatus 2A of the second embodiment does not have to receive the panel data from the first terminal apparatus 1A. Thus, a panel cooperation circuit 250A of the second terminal apparatus 2A in the second embodiment includes only an instruction information providing circuit 252A and does not include a panel data acquisition circuit. That is, the second terminal apparatus 2A includes the panel data in the case of the drawing system of the second embodiment.

Outline of Operation of Drawing System in Second Embodiment

Figure 8A:
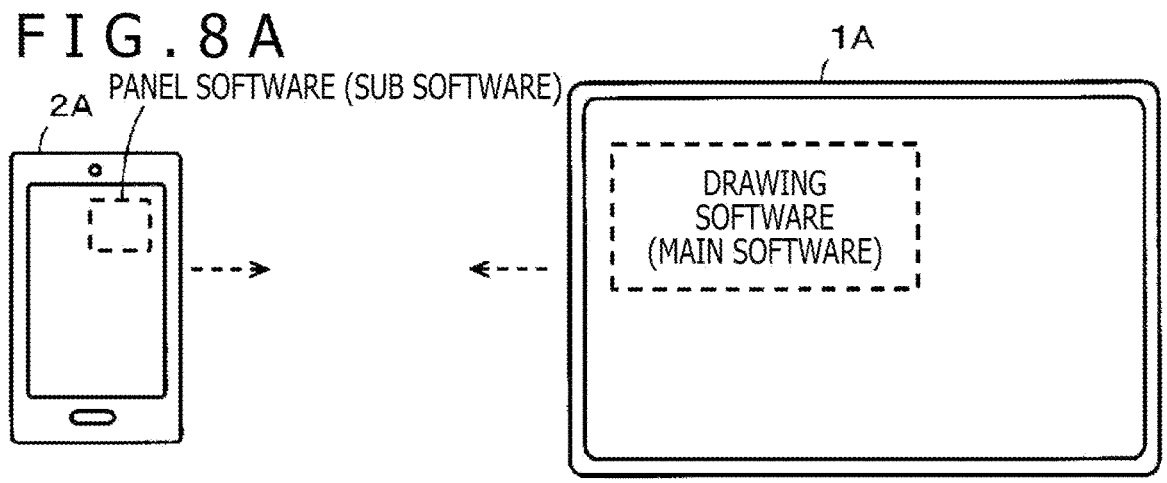
FIGS. 8A to 8C are diagrams for describing an outline of operations of the first terminal apparatus and the second terminal apparatus in the second embodiment of the present disclosure.
Figure 8B:
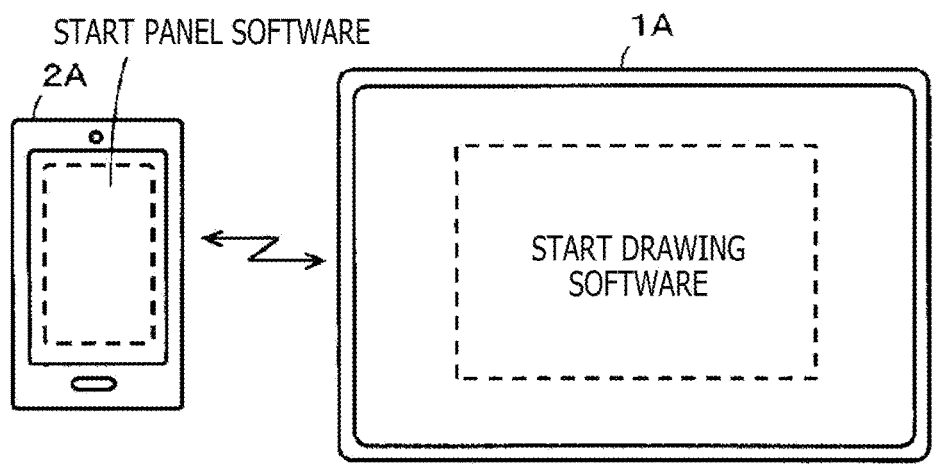
Figure 8C:
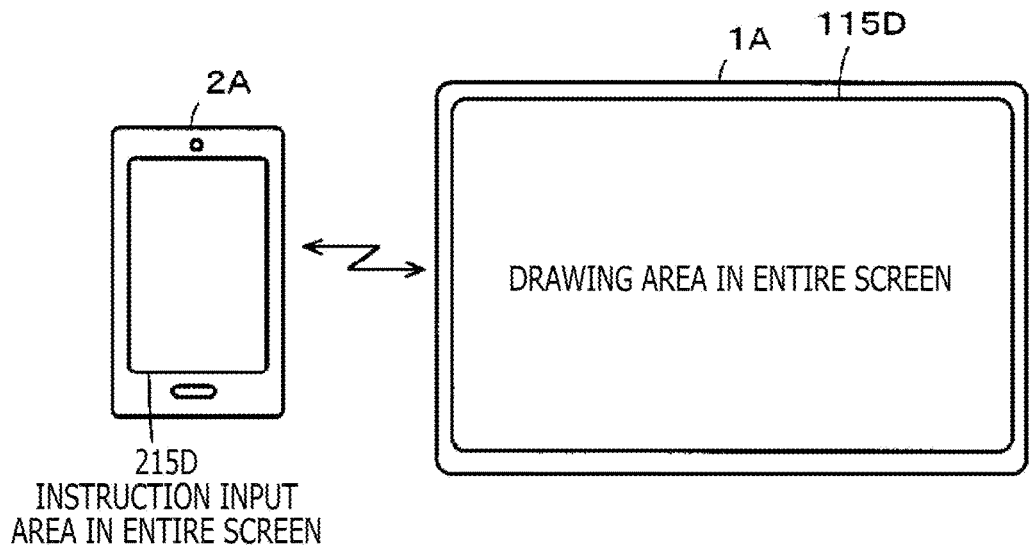

FIGS. 8A to 8C are diagrams for describing an outline of operations of the first terminal apparatus 1A and the second terminal apparatus 2A included in the drawing system of the second embodiment. As illustrated in FIG. 8A, drawing software is installed on the first terminal apparatus 1A. The drawing software is a little different from the drawing software installed on the first terminal apparatus 1 of the first embodiment. Although the drawing software sets the entire display screen 115D of the first terminal apparatus 1A as a drawing area to allow making a drawing, the drawing software does not have a function of providing the panel data to the second terminal apparatus 2A.

On the other hand, panel software is installed on the second terminal apparatus 2A. The panel software includes image data for forming the instruction input reception screen. The panel software also includes software that functions to set the entire display screen 215D of the second terminal apparatus 2A as an instruction input area, display the instruction input reception screen here, and receive the input of instruction from the user through the first sensor 211 and the second sensor 213. Note that the instruction information from the user can be obviously received through the instruction input reception screen and through the second sensor 213 and the second position detection circuit 214 as in the case of the drawing system of the first embodiment.

In the state illustrated in FIG. 8A, it is assumed that the power is input to each of the first terminal apparatus 1A and the second terminal apparatus 2A, and the terminal apparatuses cannot use the near field communication function to perform communication because the terminal apparatuses are away from each other. In this case, the first terminal apparatus 1A and the second terminal apparatus 2A function independently from each other. It is assumed that the first terminal apparatus 1A and the second terminal apparatus 2A supplied with power are brought close to each other as indicated by dotted arrows in FIG. 8A. As illustrated in FIG. 8B, it is assumed that the first terminal apparatus 1A and the second terminal apparatus 2A are close to each other and the first terminal apparatus 1A and the second terminal apparatus 2A can wirelessly communicate with each other.

In this case, the controller 130 in the first terminal apparatus 1A starts (executes) the drawing software as illustrated in FIG. 8B. On the other hand, the control circuit 230 in the second terminal apparatus 2A starts (executes) the panel software. In this way, as illustrated in FIG. 8C, the first terminal apparatus 1A uses the function of the drawing software to set the entire display screen 115D of the display device 115 as a drawing area, and a drawing can be input through the drawing area. The second terminal apparatus 2A uses the function of the panel software to set the entire display screen 215D of the display device 215 as an instruction input area. The instruction input reception screen is displayed here, and an input of instruction from the user can be received.

The instruction information providing circuit 252A functions to transmit, to the first terminal apparatus 1A, the instruction information corresponding to the input of instruction received through the instruction input reception screen displayed on the display screen 215D of the second terminal apparatus 2A and through, for example, the first sensor 211 and the first position detection circuit 212. The instruction information from the second terminal apparatus 2A includes various parameters related to drawing, such as line type and color, and the first terminal apparatus 1A can acquire the instruction information from the second terminal apparatus 2A and make a drawing in the drawing area according to the instruction information.

Processes of First Terminal Apparatus 1A and Second Terminal Apparatus 2A in Second Embodiment FIG. 9 shows flow charts for describing a process performed by the first terminal apparatus 1A and a process performed by the second terminal apparatus 2A in the second embodiment, respectively. The left side of FIG. 9 illustrates the process of the first terminal apparatus 1A, and the right side of FIG. 9 illustrates the process of the second terminal apparatus 2A. In the flow charts of FIG. 9, the same reference signs are provided to the processes executed similarly to the processes in the flow charts of FIG. 6 of the first embodiment, and the detailed description of the parts will not be repeated.

The first terminal apparatus 1A of the second embodiment performs the process illustrated in the left side of FIG. 9 in the state in which the power is input and no software is executed. The first terminal apparatus 1A uses the near field communication to connect the communication path when the first terminal apparatus 1A is close to the second terminal apparatus 2A in the process of S101 to S103. After the communication path is connected, the controller 130 in the first terminal apparatus 1A executes the drawing software to set the entire display screen 115D of the display device 115 as a drawing area to allow the user to input a drawing (S301). That is, after the process of S301, the first terminal apparatus 1A shifts to the state in which the drawing can be made according to the instruction input of the user.

Subsequently, the first terminal apparatus 1A receives the instruction information from the second terminal apparatus 2A through the near field communication antenna 141A and the near field communication circuit 141, and the instruction information acquisition circuit 152A acquires the instruction information and stores the instruction information in the drawing parameter memory 122 (S106). In this way, the drawing can be made according to the input of instruction from the user. The controller 130 repeats the process from S106 until there is a predetermined termination event (S107), and once there is a termination event, the controller 130 performs a predetermined termination process (S108) to terminate the process illustrated in the left side of FIG. 9.

On the other hand, the second terminal apparatus 2A of the second embodiment performs the process illustrated in the right side of FIG. 9 in the state in which no software is executed. The second terminal apparatus 2A uses the near field communication to connect the communication path when the second terminal apparatus 2A is close to the first terminal apparatus 1A in the process of S201 to S203. After the communication path is connected, the control circuit 230 in the second terminal apparatus 2A performs the panel software, sets the entire display screen 215D of the display device 215 as an instruction input area, and displays the instruction input reception image to allow the user to input an instruction (S401). That is, after the process of S401, the second terminal apparatus 2A shifts to the state in which the instruction information corresponding to the instruction input of the user can be received. In this way, the second terminal apparatus 2A can receive the input of instruction from the user.

It is assumed that the second terminal apparatus 2A has received an input of instruction from the user. In this case, the instruction information providing circuit 252A performs a process of forming instruction information corresponding to the received input of instruction and transmitting the instruction information to the first terminal apparatus 1A through the near field communication circuit 241 and the near field communication antenna 241A (S205). As a result, the first terminal apparatus 1A can make a drawing according to the input of instruction from the user as described above. The controller 230 repeats the process from S205 until there is a predetermined termination event (S206), and once there is a termination event, the controller 230 performs a predetermined termination process (S207) to terminate the process illustrated in the right side of FIG. 9.

In this way, the first terminal apparatus 1A includes the drawing software, and the second terminal apparatus 2A includes the panel software in the case of the drawing system of the second embodiment. The first terminal apparatus 1A can execute the drawing software to set the entire display screen 115D of the display device 115 as a drawing area to receive the input of drawing. On the other hand, the second terminal apparatus 2A can execute the panel software to set the entire display screen 215D of the display device 215 as an instruction input area. The second terminal apparatus 2A can display the instruction input reception screen to receive the input of instruction and provide the instruction information corresponding to the input of instruction to the first terminal apparatus 1A. Therefore, the first terminal apparatus 1A can use the entire display screen 115D to make a drawing corresponding to the instruction information from the user.

Third Embodiment

Configuration Examples of First Terminal Apparatus 1B and Second Terminal Apparatus 2B A drawing system of a third embodiment also includes two terminal apparatuses including a first terminal apparatus and a second terminal apparatus as in the drawing system of the first embodiment described with reference to FIG. 1. Specifically, the drawing system includes a first terminal apparatus 1B realized as a tablet PC or the like and a second terminal apparatus 2B realized as a smartphone, a small tablet PC, or the like. Both of the first terminal apparatus 1B and the second terminal apparatus 2B of the third embodiment are planar (thin) apparatuses having the basic structures described with reference to FIG. 2, as in the drawing systems of the first and second embodiments.

FIG. 10 is a block diagram for describing a configuration example of the first terminal apparatus 1B and a configuration example of the second terminal apparatus 2B in the third embodiment. As can be understood by comparing FIGS. 10 and 7, the configuration of the first terminal apparatus 1B in the third embodiment is substantially similar to the configuration of the first terminal apparatus 1A in the second embodiment, and the configuration of the second terminal apparatus 2B in the third embodiment is substantially similar to the configuration of the second terminal apparatus 2A in the second embodiment. However, software and execution modes of the software executed by the first terminal apparatus 1B and the second terminal apparatus 2B are different from those of the first terminal apparatus 1A and the second terminal apparatus 2A in the second embodiment.

In the first terminal apparatus 1B illustrated on the upper side of FIG. 10, the same reference signs are also provided to parts configured similarly to the first terminal apparatus 1 of the first embodiment described with reference to FIG. 3, and the detailed description of the parts will not be repeated. In addition, in the second terminal apparatus 2B illustrated on the lower side of FIG. 10, the same reference signs are also provided to parts configured similarly to the second terminal apparatus 2 of the first embodiment described with reference to FIG. 4, and the detailed description of the parts will not be repeated.

The controller 130 of the first terminal apparatus 1B in the third embodiment functions as a drawing software execution unit. The drawing software executed by the controller 130 has both of a drawing function and an instruction input reception function. The drawing function is a function for providing a drawing area in the display screen 115D of the display device 115 to make a drawing. The instruction input reception function is a function for providing an instruction input area in the display screen 115D of the display device 115 to display an instruction input reception screen and receive an input of instruction information.

An order of priority in the cooperation of the first terminal apparatus 1B and the second terminal apparatus 2B can be set for the drawing software of the embodiment. The order of priority is set such that the order is first for the operation of the drawing function, and the order is second for the operation of the instruction input reception function. Information indicating first in the order of priority regarding the drawing software is set (stored) in the storage apparatus 132 of the controller 130 of the first terminal apparatus 1B, and the first terminal apparatus 1B performs the drawing function when the first terminal apparatus 1B works together with the second terminal apparatus 2B.

Consequently, it is assumed that the second terminal apparatus 2B is not near the first terminal apparatus 1B and the first terminal apparatus 1B functions alone, and the drawing software is started. In this case, the first terminal apparatus 1B functions alone, and therefore, regardless of the order of priority of the drawing software, both of the drawing area R1 and the instruction input area R2 are provided in the display screen 115D of the display device 115 as illustrated in FIG. 1 to allow receiving both of the drawing input and the instruction input.

However, the order of priority of the drawing software is taken into account when the second terminal apparatus 2B is near the first terminal apparatus 1B and the communication path of the near field communication is connected and the first terminal apparatus 1B and the second terminal apparatus 2B work together to function. In this case, the order of priority regarding the drawing software of the first terminal apparatus 1B is first as described above, and only the drawing function works to execute the drawing software. In this case, the first terminal apparatus 1B does not perform the instruction input reception function.

On the other hand, the controller 230 of the second terminal apparatus 2B in the third embodiment functions as a drawing software execution unit. The drawing software executed by the controller 230 is similar to the drawing software executed by the controller 130 of the first terminal apparatus 1B. The drawing software has both of the drawing function and the instruction input reception function, and the order of priority can be set for the drawing software. Information indicating second in the order of priority regarding the drawing software is set (stored) in the storage apparatus 232 of the controller 230 of the second terminal apparatus 2B, and the second terminal apparatus 2B performs the instruction input reception function when the second terminal apparatus 2B works together with the first terminal apparatus 1B.

Consequently, it is assumed that the first terminal apparatus 1B is not near the second terminal apparatus 2B and the second terminal apparatus 2B functions alone, and the drawing software is started. In this case, the second terminal apparatus 2B functions alone, and therefore, regardless of the order of priority of the drawing software, both of the drawing area R1 and the instruction input area R2 are provided in the display screen 215D of the display device 215 to allow receiving both of the drawing input and the instruction input. In this case, although the display screen 215D is small, the drawing process can be performed as in the case where the first terminal apparatus 1B functions alone.

However, when the first terminal apparatus 1B is near the second terminal apparatus 2B and the communication path of the near field communication is connected, and the second terminal apparatus 2B and the first terminal apparatus 1B work together to function, the order of priority of the drawing software is taken into account. In this case, the order of priority regarding the drawing software of the second terminal apparatus 2B is second as described above, and the instruction input reception function works to execute the drawing software.

In this way, the drawing software having both of the drawing function and the instruction input reception function is installed and executable in each of the first terminal apparatus 1B and the second terminal apparatus 2B in the drawing system of the third embodiment. The drawing software installed on the first terminal apparatus 1B and the drawing software installed on the second terminal apparatus 2B may be exactly the same as long as they are executable. However, each terminal apparatus is generally provided with drawing software with the same functions corresponding to the operation system that functions in the terminal apparatus.

For example, it is assumed that the operating system that functions in the first terminal apparatus 1B is windows (registered trademark) and the operating system that functions in the second terminal apparatus 2B is Android (registered trademark). In this case, drawing software with similar functions is installed. Drawing software for windows (registered trademark) is installed on the first terminal apparatus 1B, and drawing software for Android (registered trademark) is installed on the second terminal apparatus 2B. Even if the same operating system functions in the first terminal apparatus 1B and the second terminal apparatus 2B, drawing software created according to the characteristics of each terminal apparatus may be obviously installed on each terminal apparatus as long as the drawing software has both of the drawing function and the instruction input reception function.

Outline of Operation of Drawing System in Third Embodiment

Figure 11A:
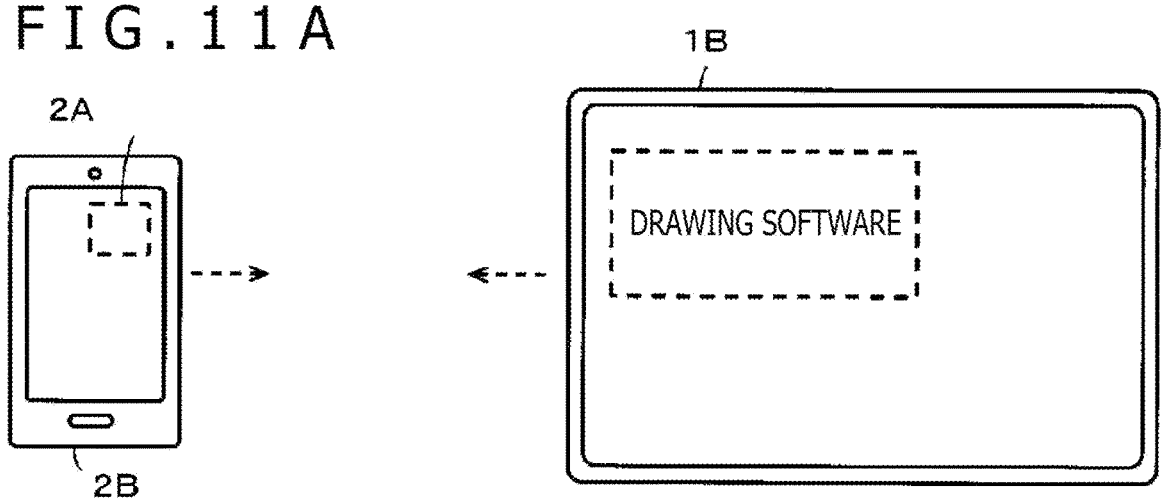
FIGS. 11A to 11C are diagrams for describing an outline of operations of the first terminal apparatus and the second terminal apparatus in the third embodiment of the present disclosure.
Figure 11B:
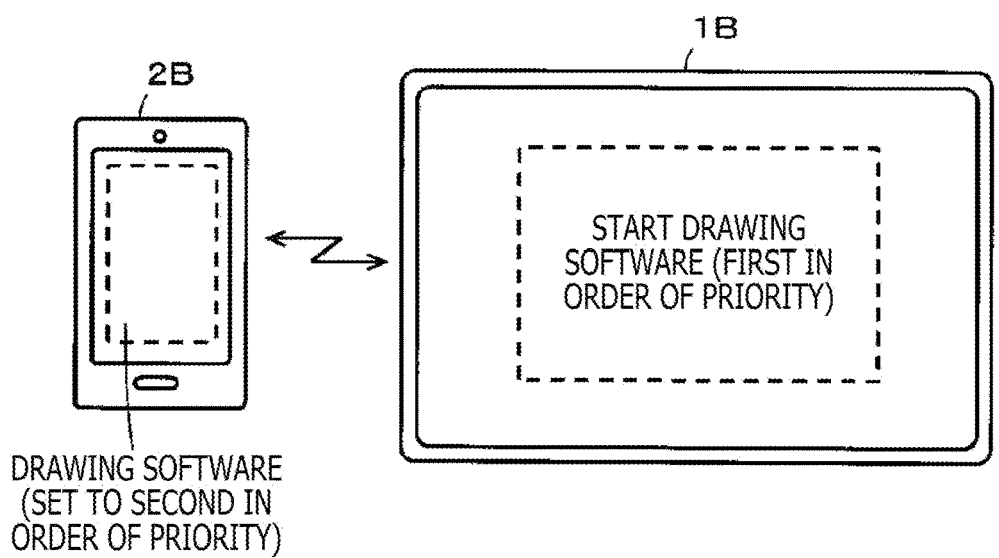
Figure 11C:
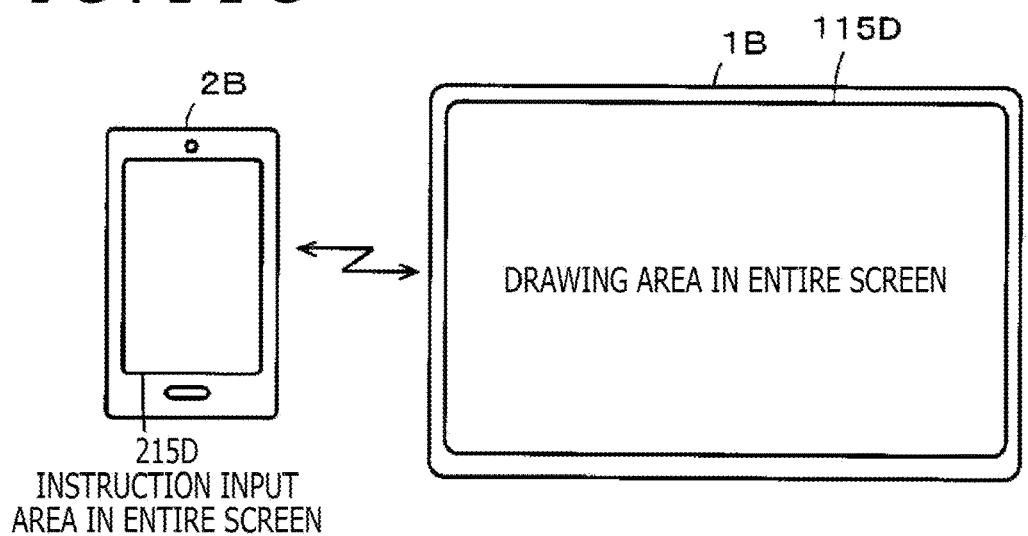

FIGS. 11A to 11C are diagrams for describing an outline of operations of the first terminal apparatus 1B and the second terminal apparatus 2B included in the drawing system of the third embodiment. As illustrated in FIG. 11A, drawing software is installed on the first terminal apparatus 1B. The drawing software is software having the drawing function and the instruction input reception function as also described above. Drawing software having the drawing function and the instruction input reception function is also installed on the second terminal apparatus 2B as in the case of the first terminal apparatus 1B.

The order of priority regarding the installed drawing software is set in the first terminal apparatus 1B and the second terminal apparatus 2B. The order of priority regarding the drawing software is first for the terminal that performs the drawing function and is second for the terminal that performs the instruction input reception function when the first terminal apparatus 1B and the second terminal apparatus 2B work together to make a drawing. In the third embodiment, the order of priority regarding the drawing software of the first terminal apparatus 1B is first, and the order of priority regarding the drawing software of the second terminal apparatus 2B is second.

In the state illustrated in FIG. 11A, it is assumed that the power is input to each of the first terminal apparatus 1B and the second terminal apparatus 2B and the terminal apparatuses cannot use the near field communication function to perform communication because the terminal apparatuses are away from each other. In this case, the first terminal apparatus 1 and the second terminal apparatus 2 function independently from each other. Therefore, when the drawing software is executed in each terminal apparatus in this state, the drawing area and the instruction input area can be provided in each of the first terminal apparatus 1B and the second terminal apparatus 2B to execute the drawing process as usual.

It is assumed that the first terminal apparatus 1B and the second terminal apparatus 2B supplied with power are brought close to each other as indicated by dotted arrows in FIG. 11A. As illustrated in FIG. 11B, it is assumed that the first terminal apparatus 1B and the second terminal apparatus 2B are close to each other and the first terminal apparatus 1B and the second terminal apparatus 2B can perform near field communication with each other.

In this case, the order of priority regarding the drawing software is first in the first terminal apparatus 1B as illustrated in FIG. 11B, and the drawing software is started (executed) to execute only the drawing function. On the other hand, the order of priority regarding the drawing software is second in the second terminal apparatus 2B, and the drawing software is started (executed) to execute only the instruction input reception function.

In this way, the first terminal apparatus 1B uses the drawing function of the drawing software to set the entire display screen 115D of the display device 115 as a drawing area as illustrated in FIG. 11C, and a drawing can be input through the drawing area. The second terminal apparatus 2B uses the instruction input reception function of the drawing software to set the entire display screen 215D of the display device 215 as an instruction input area. The instruction input reception screen is displayed here, and an input of instruction from the user can be received.

The instruction information providing circuit 252A functions to transmit, to the first terminal apparatus 1B, instruction information corresponding to the input of instruction received through the instruction input reception screen displayed on the display screen 215D of the second terminal apparatus 2B and through, for example, the first sensor 211 and the first position detection circuit 212. The instruction information from the second terminal apparatus 2B includes various parameters related to drawing, such as line type and color, and the first terminal apparatus 1B can acquire the instruction information from the second terminal apparatus 2A and make a drawing in the drawing area according to the instruction information.

Processes of First Terminal Apparatus 1B and Second Terminal Apparatus 2B in Third Embodiment FIG. 12 shows flow charts for describing a process performed by the first terminal apparatus 1B and a process performed by the second terminal apparatus 2B in the third embodiment, respectively. The left side of FIG. 12A illustrates the process of the first terminal apparatus 1B, and the right side of FIG. 12B illustrates the process of the second terminal apparatus 2B. In the flow charts of FIG. 12, the same reference signs are provided to the processes executed similarly to the processes in the flow charts of FIG. 6 of the first embodiment, and the detailed description of the parts will not be repeated.

The first terminal apparatus 1B performs the process illustrated in the left side of FIG. 12 in the state in which the power is input, and no software is executed. The first terminal apparatus 1B uses the near field communication to connect the communication path when the first terminal apparatus 1B is close to the second terminal apparatus 2B in the process of S101 to S103. After the communication path is connected, the controller 130 in the first terminal apparatus 1B starts (executes) the drawing software to execute only the drawing function because the order of priority regarding the drawing software is first (S501). In this way, after the process of S501, the first terminal apparatus 1B shifts to the state in which the drawing can be made according to the instruction input of the user. The first terminal apparatus 1B sets the entire display screen 115D of the display device 115 as a drawing area to allow the user to input a drawing.

Subsequently, the first terminal apparatus 1B receives the instruction information from the second terminal apparatus 2B through the near field communication antenna 141A and the near field communication circuit 141, and the instruction information acquisition circuit 152A acquires the instruction information and stores the instruction information in the drawing parameter memory 122 (S106). In this way, the drawing can be made according to the input of instruction from the user. The controller 130 repeats the process from S106 until there is a predetermined termination event (S107), and once there is a termination event, the controller 130 performs a predetermined termination process (S108) to terminate the process illustrated in FIG. 11A.

On the other hand, the second terminal apparatus 2B performs the process illustrated in the left side of FIG. 12 in the state in which the power is input and no software is executed. The second terminal apparatus 2B uses the near field communication to connect the communication path when the second terminal apparatus 2B is close to the first terminal apparatus 1B in the process of S201 to S203. After the communication path is connected, the controller 230 in the second terminal apparatus 2B starts (executes) the drawing software to execute only the instruction input reception function because the order of priority regarding the drawing software is second (S601). That is, after the process of S601, the second terminal apparatus 2B shifts to the state in which the instruction information corresponding to the instruction input of the user can be received. In this way, the second terminal apparatus 2B sets the entire display screen 215D of the display device 215 as an instruction input area and displays the instruction input reception image to allow the user to input an instruction.

It is assumed that the second terminal apparatus 2B has received an input of instruction from the user. In this case, the instruction information providing circuit 252A performs a process of forming instruction information corresponding to the received input of instruction and transmitting the instruction information to the first terminal apparatus 1B through the near field communication circuit 241 and the near field communication antenna 241A (S205). As a result, the first terminal apparatus 1B can make a drawing according to the input of instruction from the user as described above. The controller 230 repeats the process from S205 until there is a predetermined termination event (S206), and once there is a termination event, the controller 230 performs a predetermined termination process (S207) to terminate the process illustrated in the right side of FIG. 12.

In this way, when the first terminal apparatus 1B and the second terminal apparatus 2B are not close to each other and each apparatus starts the drawing software alone, each apparatus can provide the drawing area and the instruction input reception area on the display screen of the apparatus to perform the conventional drawing process in the drawing system of the third embodiment. However, although each of the first terminal apparatus 1B and the second terminal apparatus 2B executes the drawing software when the apparatuses are close to each other, the first terminal apparatus 1B performs the drawing function, and the second terminal apparatus 2B performs the instruction input reception function. In this case, a drawing can be made through the entire display screen 115D of the display device 115 of the first terminal apparatus 1B. An instruction can be input through the entire display screen 215D of the display device 215 of the second terminal apparatus 2B, and the instruction information corresponding to the received input of instruction can be provided to the first terminal apparatus 1B.

Attachment of Second Terminal Apparatus 2, 2A, or 2B to User

Each of the drawing systems in the first to third embodiments includes two terminal apparatuses including the first terminal apparatus (1, 1A, 1B) and the second terminal apparatus (2, 2A, 2B). Therefore, when the drawing system is used on a desk, the terminal apparatuses can be operated on the desk, and there is no problem in the operation. However, when, for example, the user makes a sketch outdoors, the user needs to hold the first terminal apparatus and the second terminal apparatus by hands, and the user may not be able to use the drawing system to freely make a drawing.

Figure 13A:
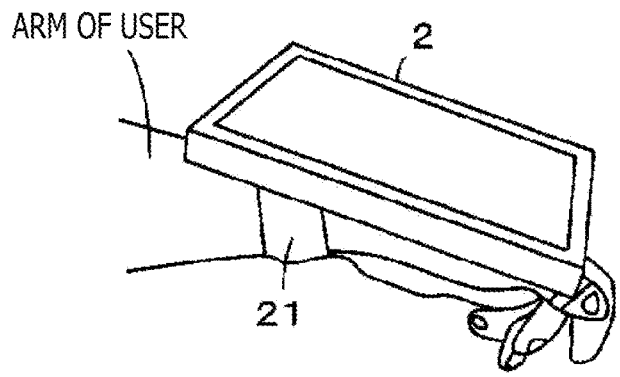
FIGS. 13A to 13C are diagrams for describing an example of attachment of the second terminal apparatus to a body of a user.
Figure 13B:
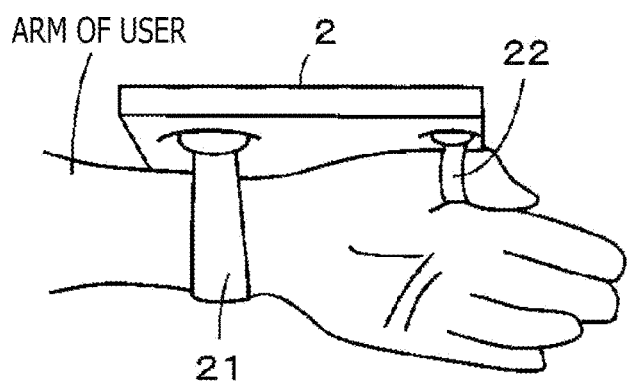
Figure 13C:
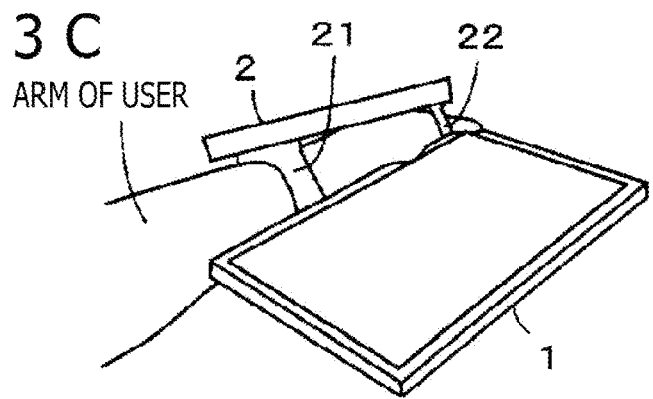

Therefore, the first terminal apparatus (1, 1A, 1B) provided with the drawing area is gripped by a hand, and the second terminal apparatus (2, 2A, 2B) is attached to the arm on the side of the hand gripping the first terminal apparatus (1, 1A, 1B) to free the other hand. In this way, the electronic pen can be held by the other hand, and both of the first terminal apparatus and the second terminal apparatus can be operated to freely make a drawing. FIGS. 13A to 13C are diagrams for describing an example of attachment of the second terminal apparatus (2, 2A, 2B) to the body of the user. The first terminal apparatus 1 and the second terminal apparatus 2 of the first embodiment are used in the example described here.

As illustrated in FIGS. 13A and 13B, a wristband 21 and a finger band 22 are attached to the surface (back surface) on the opposite side of the display screen 215D of the second terminal apparatus 2. Various methods can be used for the attachment. For example, locking members provided at both ends of the wristband 21 are fitted into grooves for wristband provided on the back surface of the second terminal apparatus 2 to prevent the wristband 21 from easily coming off. Locking members provided on the finger band 22 are fitted into grooves for finger band provided on the back surface of the second terminal apparatus 2 to prevent the finger band 22 from easily coming off.

The user can put the wristband 21 on the arm of the user and put the finger band 22 on, for example, the thumb of the user to attach the second terminal apparatus 2 to the arm of the user as illustrated in FIGS. 13A and 13B. The user can move the arm provided with the second terminal apparatus 2 to the left or right or move the wrist of the arm provided with the second terminal apparatus 2 to thereby slightly shift the position of the second terminal apparatus 2 attached to the arm of the user or adjust the direction (tilt) of the display screen 215D.

As illustrated in FIG. 13C, the user can further use the hand on the side provided with the second terminal apparatus 2 to grip the first terminal apparatus 1, and both of the first terminal apparatus 1 and the terminal apparatus 2 can be held (gripped) by the hand (including the arm) of the user. In this way, the other hand can just hold the electronic pen, and the user can use the electronic pen to operate both of the first terminal apparatus 1 and the second terminal apparatus 2 even at an outdoor location or the like. The user can freely input a drawing to the first terminal apparatus 1 according to the intention of the user.

Note that the example of FIG. 13C illustrates a case in which the second terminal apparatus 2 is attached to the left arm of the user, and the first terminal apparatus 1 is gripped by the left hand. Therefore, the user can use the right hand to hold the electronic pen to freely input a drawing. Obviously, the second terminal apparatus 2 can be attached to the right arm, and the first terminal apparatus 1 can be gripped by the right hand. The user can also use the left hand to hold the electronic pen to operate both of the first terminal apparatus 1 and the second terminal apparatus 2. The drawing systems of the second and third embodiments can also be used in the mode described with reference to FIGS. 13A to 13C.

Authentication by Electronic Pen

In the first, second, and third embodiments, the drawing system operates when the first terminal apparatus (1, 1A, 1B) and the second terminal apparatus (2, 2A, 2B) approach each other and near field communication can be used to connect the communication path. However, the user may possess a plurality of terminal apparatuses, or there may be a terminal apparatus of another person nearby. In such a case, the first terminal apparatus and the second terminal apparatus to be paired may not be paired, or the drawing system may not properly operate, although only to some extent.

Therefore, the electronic pen commonly used by the user in the first terminal apparatus (1, 1A, 1B) and the second terminal apparatus (2, 2A, 2B) is used to authenticate the terminals that connect the communication path through near field communication. To put is simply, the terminal apparatus that has received the instruction input of the electronic pen uses near field communication to issue a connection request. When the terminal apparatus receives a connection request from another terminal, and the terminal apparatus also issues a connection request, the communication path can be connected between the transmission source of the connection request and the terminal apparatus. In this way, the first terminal apparatus and the second terminal apparatus included in the drawing system can be paired.

However, when there are three or more terminal apparatuses that can receive instructions from the electronic pen, the terminal apparatuses may not be appropriately paired by the method. Therefore, electronic pen identification information (electronic pen ID (identification)) specific to the electronic pen is included in a position instruction signal transmitted from the electronic pen used by the user using the drawing system. The first terminal apparatus 1 and the second terminal apparatus 2 that have received the position instruction signal including the electronic pen ID from the electronic pen extract the electronic pen ID included in the position instruction signal from the electronic pen and hold the electronic pen ID. The first terminal apparatus 1 and the second terminal apparatus 2 further form connection requests including the held electronic pen ID and use near field communication to transmit the connection requests.

Each of the first terminal apparatus 1 and the second terminal apparatus 2 connects the communication path with the other terminal apparatus that has transmitted the connection request including the same electronic pen ID as the electronic pen ID held by the apparatus. In this way, the communication path can be connected between the paired first terminal apparatus 1 and second terminal apparatus 2 included in the drawing system, and the drawing system can be appropriately provided and operated.

FIG. 14 is a block diagram for describing a configuration example of the drawing system that uses the electronic pen ID to perform the authentication process. In FIG. 14, an electronic pen authentication circuit 170 provided on a first terminal apparatus 1C and an electronic pen authentication circuit 270 provided on a second terminal apparatus 2C are main parts that realize the electronic pen authentication function. The parts other than the electronic pen authentication circuit 170 of the first terminal apparatus 1C are parts configured similarly to the first terminal apparatus 1 of the first embodiment. Similarly, the parts other than the electronic pen authentication circuit 270 of the second terminal apparatus 2C are parts configured similarly to the second terminal apparatus 2 of the first embodiment.

Specifically, the user interface circuit 110 in the first terminal apparatus 1C functions to receive a position instruction signal from the electronic pen and extract the electronic pen ID from the position instruction signal. The user interface circuit 110 supplies the electronic pen ID to the electronic pen authentication circuit 170. The electronic pen authentication circuit 170 holds the electronic pen ID from the user interface circuit 110 and works together with the connection circuit 140 under the control of the controller 130 to form a connection request including the electronic pen ID. The electronic pen authentication circuit 170 uses near field communication to transmit the connection request. The connection request received by the electronic pen authentication circuit 170 through the connection circuit 140 includes the electronic pen ID. Therefore, the electronic pen authentication circuit 170 controls the connection circuit 140 to connect the communication path with the transmission source of the connection request when the electronic pen ID is the same as the electronic pen ID held by the electronic pen authentication circuit 170.

Similarly, the user interface unit 210 in the second terminal apparatus 2C functions to receive a position instruction signal from the electronic pen and extract the electronic pen ID from the position instruction signal. The user interface unit 210 supplies the electronic pen ID to the electronic pen authentication circuit 270. The electronic pen authentication circuit 270 holds the electronic pen ID from the user interface unit 210 and works together with the connection circuit 240 under the control of the controller 230 to form a connection request including the electronic pen ID. The electronic pen authentication circuit 270 uses near field communication to transmit the connection request. The connection request received by the electronic pen authentication circuit 270 through the connection circuit 240 includes the electronic pen ID. Therefore, the electronic pen authentication circuit 270 controls the connection circuit 240 to connect the communication path with the transmission source of the connection request when the electronic pen ID is the same as the electronic pen ID held by the electronic pen authentication circuit 270.

In this way, the communication path is connected between the first terminal apparatus 1C and the second terminal apparatus 2C, and the drawing system including the first terminal apparatus 1 and the second terminal apparatus 2 is appropriately provided. In this case, even if there is any other terminal apparatus between the first terminal apparatus 1C and the second terminal apparatus 2C, the first terminal apparatus 1C and the second terminal apparatus 2C do not connect the communication path with the other terminal apparatus. As a result, the drawing system can be appropriately provided at all times. Similar authentication processes can also be executed in the cases of the drawing system of the second embodiment and the drawing system of the third embodiment.

Advantageous Effects of Embodiments

As can be understood from the description of the embodiments, the first terminal apparatus (1, 1A, 1B, 1C) can use the entire display screen of the display device 115 as a drawing area to receive an input of drawing. The second terminal apparatus (2, 2A, 2B, 2C) can set the entire display screen of the display device 215 as an instruction input area, display the instruction input reception screen here, and receive an input of instruction from the user. The second terminal apparatus (2, 2A, 2B, 2C) can provide the instruction information to the first terminal apparatus (1, 1A, 1B, 1C) according to the received input of instruction. As a result, the first terminal apparatus (1, 1A, 1B, 1C) can make a drawing according to the instruction input of the user.

In this way, a large drawing area can be reserved on the display screen of the first terminal apparatus (1, 1A, 1B, 1C) in the drawing system of each embodiment. The instruction input area can be provided on the display screen of the second terminal apparatus (2, 2A, 2B, 2C), and the input of instruction to the instruction input area can also be received at appropriate timing. The input of instruction can be provided to the first terminal apparatus (1, 1A, 1B, 1C) to make a drawing corresponding to the instruction of the user.

Modifications

Note that the first sensor 111 of the first terminal apparatus (1, 1A, 1B, 1C) and the first sensor 211 of the second terminal apparatus (2, 2A, 2B, 2C) in each embodiment are electromagnetic induction sensors. Therefore, the same electronic pen can be used to input a drawing or input an instruction. The second sensor 113 of the first terminal apparatus (1, 1A, 1B, 1C) and the second sensor 213 of the second terminal apparatus (2, 2A, 2B, 2C) in each embodiment are capacitive sensors. Therefore, a finger of the user or a capacitive pen can be used to perform the input. This allows to use the electronic pen to input a drawing to the first terminal apparatus (1, 1A, 1B, 1C) and use the finger of the user to input an instruction to the second terminal apparatus (2, 2A, 2B, 2C).

Each of the first terminal apparatus and the second terminal apparatus included in the drawing system does not have to include both of the electromagnetic induction sensor and the capacitive sensor. It is only necessary that each of the first terminal apparatus and the second terminal apparatus include only one of the electromagnetic induction sensor and the capacitive sensor. The first terminal apparatus realizes the drawing function, and therefore, it is only necessary that the first terminal apparatus include a sensor that allows the user to use an electronic pen or a capacitive pen to input a drawing.

There are following four combinations of sensors. (1) There is a case in which both of the first terminal apparatus and the second terminal apparatus include electromagnetic induction sensors. (2) There is a case in which both of the first terminal apparatus and the second terminal apparatus include capacitive sensors. (3) There is a case in which the first terminal apparatus includes an electromagnetic induction sensor, and the second terminal apparatus includes a capacitive sensor. (4) There is a case in which the first terminal apparatus includes a capacitive sensor, and the second terminal apparatus includes an electromagnetic induction sensor.

Although the near field communication is used to connect the first terminal apparatus (1, 1A, 1B, 1C) and the second terminal apparatus (2, 2A, 2B, 2C) in the embodiments, the connection is not limited to this. The terminal apparatuses may be connected through a wire. In this case, the communication path with another terminal apparatus can be connected through the wire when the connection with the other terminal apparatus through the wire is confirmed.

Although the communication path is connected to automatically start (execute) the drawing software and the panel software when the first terminal apparatus (1, 1A, 1B, 1C) and the second terminal apparatus (2, 2A, 2B, 2C) are close to each other in the embodiments, the configuration is not limited to this. It is assumed here that the first terminal apparatus (1, 1A, 1B, 1C) and the second terminal apparatus (2, 2A, 2B, 2C) approach each other to connect the communication path. In this case, the drawing software and the panel software may be started (executed) when, for example, one or both of the first terminal apparatus (1, 1A, 1B, 1C) and the second terminal apparatus (2, 2A, 2B, 2C) receive an input of operation for making a drawing.

Although the second terminal apparatus (2, 2A, 2B, 2C) is provided as a smartphone or a tablet PC in the description, the configuration is not limited to this. For example, the second terminal apparatus (2, 2A, 2B, 2C) may be a watch-type terminal apparatus called a smartwatch or the like or may be various wearable terminals (terminals attached to the bodies of users) in which instructions can be input.

The number of instruction input reception screens used in the second terminal apparatus (2, 2A, 2B, 2C) is not limited to one. A plurality of instruction input reception screens for receiving different types of information may be obviously prepared, and the instruction input reception screens may be switched and used according to instructions of the user. This can be controlled by the control circuit 231.

Operation buttons provided on the second terminal apparatus (2, 2A, 2B, 2C) can be used as a left click button and a right click button of a generally-called mouse that is a pointing device of a personal computer. More specifically, a thing on the display screen 115D of the display device 115 of the first terminal apparatus (1, 1A, 1B, 1C) can be selected, moved, or executed when a predetermined operation button provided on the second terminal apparatus (2, 2A, 2B, 2C) is pressed. The first terminal apparatus (1, 1A, 1B, 1C) can display a menu of functions executable at that time to allow selecting a function when another predetermined operation button provided on the second terminal apparatus (2, 2A, 2B, 2C) is pressed.

Furthermore, it is assumed that a side switch is provided on the electronic pen, and near field communication can be used to transmit operation information of the side switch. In this case, the side switch of the electronic pen can be used as a left click button and a right click button of a generally-called mouse that is a point device of a personal computer, and the buttons can be used to, for example, operate the first terminal apparatus (1, 1A, 1B, 1C). Obviously, information corresponding to the operation for the side switch of the electronic pen can also be used to operate the second terminal apparatus (2, 2A, 2B, 2C). Therefore, for example, the user can set, in each terminal apparatus, which one of the first terminal apparatus (1, 1A, 1B, 1C) and the second terminal apparatus (2, 2A, 2B, 2C) can be operated in response to the operation of the side switch of the electronic pen.

The sizes of the display screens of the display devices in the first terminal apparatus (1, 1A, 1B, 1C) and the second terminal apparatus (2, 2A, 2B, 2C) are not limited to the mode illustrated in FIG. 1. The first terminal apparatus (1, 1A, 1B, 1C) and the second terminal apparatus (2, 2A, 2B, 2C) may include display devices of the same size. The display screen of the display device in the second terminal apparatus (2, 2A, 2B, 2C) may be larger than the display screen of the display device in the first terminal apparatus (1, 1A, 1B, 1C).

It is to be noted that the embodiment of the present disclosure is not limited to the foregoing embodiment, and that various changes can be made without departing from the spirit of the present disclosure.

The invention claimed is:

1. A drawing system comprising:
a first terminal apparatus including a first display device and a first position detection sensor corresponding to a display screen of the first display device; and
a second terminal apparatus including a second display device and a second position detection sensor corresponding to a display screen of the second display device, the first terminal apparatus and the second terminal apparatus connected to each other and capable of communicating with each other, wherein:
the first terminal apparatus includes:
an instruction information acquisition unit that acquires instruction information transmitted from the second terminal apparatus,
a drawing processing unit that sets the display screen of the first display device as a drawing area and that makes a drawing in the drawing area according to the instruction information acquired through the instruction information acquisition unit and according to a drawing operation input received through the first position detection sensor, and
a screen information providing unit that transmits screen information to the second terminal apparatus when a communication path is connected between the first terminal apparatus and the second terminal apparatus, the screen information including information for forming an instruction input reception screen, the screen information necessary for receiving and transmitting the instruction information, and the second terminal apparatus includes:
   a reception screen display processing unit that sets the display screen of the second display device as an instruction input area and that displays the instruction input reception screen in the instruction input area,
   an instruction information providing unit that transmits, to the first terminal apparatus, the instruction information received through the instruction input reception screen displayed in the instruction input area and through the second position detection sensor, and
   a screen information acquisition unit that acquires the screen information transmitted from the first terminal apparatus,
the reception screen display processing unit displays the instruction input reception screen in the instruction input area to allow receiving the instruction information based on the information included in the screen information acquired through the screen information acquisition unit.

2. The drawing system according to claim 1, wherein the first terminal apparatus includes:
   a first control unit that executes predetermined drawing software to control the instruction information acquisition unit and the drawing processing unit when a communication path is connected between the first terminal apparatus and the second terminal apparatus, and
the second terminal apparatus includes:
   a second control unit that executes predetermined input reception software to control the reception screen display processing unit and the instruction information providing unit when a communication path is connected between the second terminal apparatus and the first terminal apparatus.

3. The drawing system according to claim 1, wherein the first terminal apparatus includes:
   first drawing software having both of a drawing function for providing the drawing area on the display screen of the first display device to make a drawing and an instruction input reception function for providing the instruction input area on the display screen of the first display device and displaying the instruction input reception screen to receive an input of the instruction information, and
   a first control unit that sets the display screen of the first display device as the drawing area and that uses the drawing function to execute the first drawing software to control the instruction information acquisition unit and the drawing processing unit when a communication path is connected between the first terminal apparatus and the second terminal apparatus, and
the second terminal apparatus includes:
   second drawing software having both of a drawing function for providing the drawing area on the display screen of the second display device to make a drawing and an instruction input reception function for providing the instruction input area on the display screen of the second display device and displaying the instruction input reception screen to receive an input of the instruction information, and a second control unit that uses the instruction input reception function to execute the second drawing software to control the reception screen display processing unit and the instruction information providing unit when a communication path is connected between the second terminal apparatus and the first terminal apparatus.

4. The drawing system according to claim 1, wherein the first position detection sensor of the first terminal apparatus and the second position detection sensor of the second terminal apparatus can be operated by a same electronic pen.

5. The drawing system according to claim 4, wherein:
the first terminal apparatus includes:
   a first reception section receiving electronic pen identification information transmitted from the electronic pen,
   a first identification information providing section transmitting the electronic pen identification information received through the first reception section to the second terminal apparatus,
   a first identification information acquisition section acquiring electronic pen identification information transmitted from the second terminal apparatus, and
   a first authentication control section connecting a connection path between the first terminal apparatus and the second terminal apparatus when the electronic pen identification information received through the first reception section and the electronic pen identification information acquired through the first identification information acquisition section are same, and
the second terminal apparatus includes:
   a second reception section receiving electronic pen identification information transmitted from the electronic pen,
   a second identification information providing section transmitting the electronic pen identification information received through the second reception section to the first terminal apparatus,
   a second identification information acquisition section acquiring electronic pen identification information transmitted from the first terminal apparatus, and
   a second authentication control section connecting a communication path between the second terminal apparatus and the first terminal apparatus when the electronic pen identification information received through the second reception section and the electronic pen identification information acquired through the second identification information acquisition section are same.

6. The drawing system according to claim 1, wherein the second position detection sensor of the second terminal apparatus enables to use a finger of a user to perform a touch operation.

7. The drawing system according to claim 1, wherein:
the first terminal apparatus includes:
   a first communication unit that transmits and receives a signal wirelessly or through a wire, and
   a connection determination unit that makes a connection determination based on a result of communication through the first communication unit, and
the second terminal apparatus includes:
   a second communication unit that transmits and receives a signal wirelessly or through a wire, and a connection determination unit that makes a connection determination based on a result of communication through the second communication unit.

8. The drawing system according to claim 7, wherein:
the first terminal apparatus includes a first operation unit that starts communication through the first communication unit, and
the first communication unit starts a communication process for connecting a communication path between the first communication unit and the second communication unit of the second terminal apparatus when the first operation unit is operated.

9. The drawing system according to claim 7, wherein:
the second terminal apparatus includes:
   a second operation unit that starts communication through the second communication unit, and
   the second communication unit starts a communication process for connecting a communication path between the second communication unit and the first communication unit of the first terminal apparatus when the second operation unit is operated.

10. The drawing system according to claim 1, wherein the second terminal apparatus includes a fixture for attachment to a body of a user.

* * * * *